US008963894B2

(12) United States Patent
Klassen et al.

(10) Patent No.: US 8,963,894 B2
(45) Date of Patent: Feb. 24, 2015

(54) ELECTRONIC DEVICE AND METHOD PROVIDING IMPROVED ALARM CLOCK FEATURE AND FACILITATED ALARM EDITING MODE

(75) Inventors: Gerhard Dietrich Klassen, Waterloo (CA); Kalu Onuka Kalu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1162 days.

(21) Appl. No.: 12/463,552

(22) Filed: May 11, 2009

(65) Prior Publication Data

US 2009/0284389 A1 Nov. 19, 2009

Related U.S. Application Data

(60) Provisional application No. 61/052,255, filed on May 11, 2008.

(51) Int. Cl.

| | |
|---|---|
| ***G06F 3/033*** | (2013.01) |
| ***G06F 3/02*** | (2006.01) |
| ***G06F 3/00*** | (2006.01) |
| ***G06F 3/048*** | (2013.01) |
| ***G04F 8/00*** | (2006.01) |

(Continued)

(52) U.S. Cl.

CPC ................ *G04G 11/00* (2013.01); *G04G 13/02* (2013.01); *G04G 13/026* (2013.01)

USPC ........... 345/184; 345/169; 715/703; 715/780; 368/109; 368/72

(58) Field of Classification Search

CPC ............. G06F 3/01; G06F 3/02; G06F 3/048; G06F 3/0484; G04G 5/04; G04G 13/02; G04G 13/021; G04G 13/025; G04G 13/026

USPC ......... 345/156, 161–162, 167–169, 172–173, 345/184; 455/556.2, 90.1; 715/703, 780, 715/864, 788, 800; 368/10, 12–13, 21–22, 368/109, 243–251, 261–263, 266–267, 72

See application file for complete search history.

(56) References Cited

U.S. PATENT DOCUMENTS 4,415,273 A 11/1983 Hoffman et al.
4,681,460 A 7/1987 Nishimura (Continued)

FOREIGN PATENT DOCUMENTS

DE 10 2004 026414 A1 12/2005
EP 1043638 A2 10/2000

(Continued)

OTHER PUBLICATIONS

Bream, Philip; Search Report from corresponding European Application No. 09159940.7; search completed Sep. 6, 2010.

(Continued)

*Primary Examiner* — Temesgh Ghebretinsae
*Assistant Examiner* — Keith Crawley
(74) *Attorney, Agent, or Firm* — Brett J. Slaney; Blake, Cassels & Graydon LLP

(57) ABSTRACT

An improved electronic device and method provide an improved clock feature that includes an improved alarm clock function and a BEDTIME mode that is initiated by execution of a BEDTIME mode routine. The alarm clock function enables an alarm to be edited very easily.

20 Claims, 24 Drawing Sheets

FIG. 7A

(51) Int. Cl.

| | |
|---|---|
| ***G04C 23/00*** | (2006.01) |
| ***G04G 11/00*** | (2006.01) |
| ***G04G 13/02*** | (2006.01) |

(56) References Cited

U.S. PATENT DOCUMENTS

| | | | | |
|---|---|---|---|---|
| 5,559,762 | A * | 9/1996 | Sakamoto | 368/74 |
| 5,724,316 | A | 3/1998 | Brunts | |
| 6,236,622 | B1 | 5/2001 | Blackman | |
| 6,477,117 | B1 * | 11/2002 | Narayanaswami et al. | 368/251 |
| 6,546,231 | B1 * | 4/2003 | Someya et al. | 455/550.1 |
| 6,556,513 | B2 | 4/2003 | Wimberly | |
| 6,600,936 | B1 * | 7/2003 | Karkkainen et al. | 455/566 |
| 6,832,084 | B1 | 12/2004 | Deo et al. | |
| 7,081,905 | B1 | 7/2006 | Raghunath | |
| 7,433,274 | B1 * | 10/2008 | Bath | 368/73 |
| 7,463,556 | B2 | 12/2008 | Hocherman | |
| 7,907,476 | B2 * | 3/2011 | Lee | 368/10 |
| 2003/0125075 | A1 | 7/2003 | Klovborg | |
| 2004/0029546 | A1 | 2/2004 | Tsuchi et al. | |
| 2004/0151076 | A1 | 8/2004 | Fidel | |
| 2004/0204074 | A1 | 10/2004 | Desai | |
| 2004/0210853 | A1 * | 10/2004 | Detter | 715/864 |
| 2005/0058026 | A1 | 3/2005 | Hocherman | |
| 2006/0062085 | A1 | 3/2006 | Evans | |
| 2006/0082453 | A1 | 4/2006 | Kaiser | |
| 2006/0217144 | A1 | 9/2006 | Bonnelykke Kristensen et al. | |
| 2007/0037610 | A1 | 2/2007 | Logan | |
| 2007/0109291 | A1 | 5/2007 | Hoshino et al. | |
| 2007/0217290 | A1 | 9/2007 | Rock | |
| 2007/0268784 | A1 * | 11/2007 | Xu | 368/73 |
| 2007/0293200 | A1 | 12/2007 | Roundtree et al. | |
| 2008/0150959 | A1 * | 6/2008 | Marui | 345/594 |
| 2009/0143114 | A1 * | 6/2009 | Vargas et al. | 455/574 |

FOREIGN PATENT DOCUMENTS

| | | | |
|---|---|---|---|
| EP | 1376275 | A1 | 1/2004 |
| EP | 1715702 | A1 | 10/2006 |
| GB | 2270397 | A | 3/1994 |
| GB | 2275547 | A | 8/1994 |
| WO | WO 00/38338 | A1 | 6/2000 |
| WO | 2006/123211 | A2 | 11/2006 |
| WO | WO 2008/030976 | A2 | 3/2008 |

OTHER PUBLICATIONS

Bream, Phillip; Search Report from corresponding European Application No. 09159942.3; search completed Sep. 9, 2010.

Bream, Philip; Search Report from corresponding European Application No. 09159943.1; search completed Jul. 20, 2010.

Bream, Philip; Search Report from corresponding European Application No. 09159937.3; search completed Aug. 3, 2010.

Bream, Philip; Search Report from corresponding European Application No. 09159938.1; search completed Oct. 13, 2009.

Bream, Philip; Search Report from corresponding European Application No. 09159939.9; search completed Jan. 18, 2010.

Bream, Philip; Search Report from corresponding European Application No. 09159941.5; search completed Sep. 7, 2010.

HTC Corp.; "Tough Phone User Manual"; 2007; Retrieved from the internet on Feb. 3, 2010 from http://member.america.htc.com/download/web_materials/Manual/HTC_Touch/070820_Elf_HTCTough_English_Manual.pdf.

* cited by examiner

ELECTRONIC DEVICE AND METHOD PROVIDING IMPROVED ALARM CLOCK FEATURE AND FACILITATED ALARM EDITING MODE

CROSS-REFERENCE TO RELATED APPLICATION

The instant application claims priority from U.S. Provisional Patent Application Ser. No. 61/052,255 filed May 11, 2008, the disclosures of which are incorporated herein by reference.

BACKGROUND

1. Field

The disclosed concept relates generally to electronic devices and, more particularly, to an electronic device and method that provide an improved alarm clock feature having an improved alarm editing mode.

2. Background Information

Numerous types of electronic devices are known. Examples of such electronic devices include, for instance, personal digital assistants (PDAs), handheld computers, two-way pagers, cellular telephones, and the like. Many electronic devices also feature a wireless communication capability, although many such electronic devices are stand-alone devices that are functional without communication with other devices.

BRIEF DESCRIPTION OF THE DRAWINGS

A full understanding of the disclosed concept can be gained from the following Description when read in conjunction with the accompanying drawings in which.

Similar numerals refer to similar parts throughout the specification.

DESCRIPTION

Figure 1:
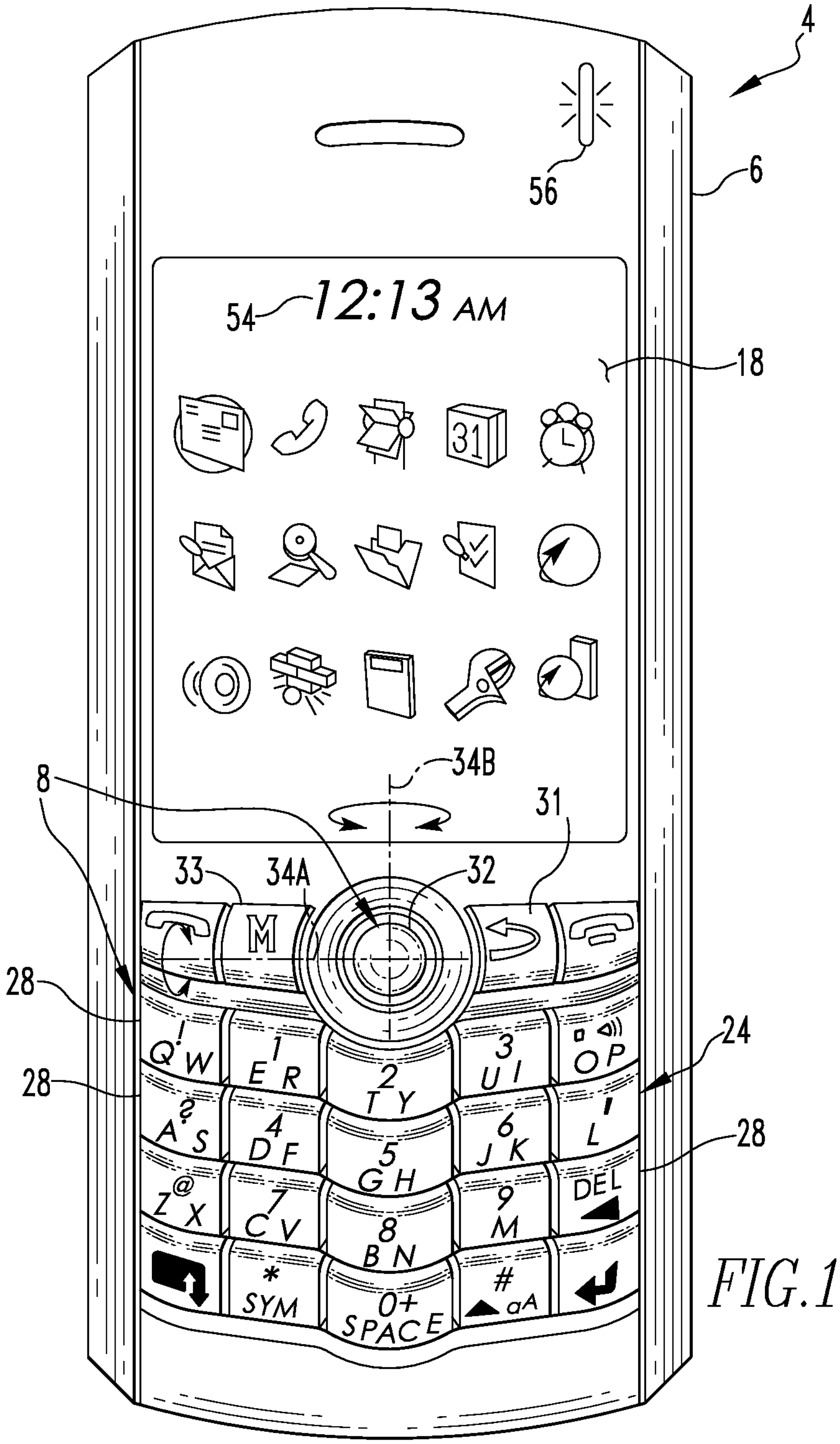
FIG. 1 is a top plan view of an exemplary improved electronic device in accordance with one embodiment of the present disclosure.

Disclosed are an electronic device and a method on the electronic device. The electronic device comprises an I/O apparatus, the method comprising executing the electronic device in a predetermined mode that comprises outputting on a display of the I/O apparatus a current time with use of a visual object having a size in one dimension that is at least about one-half as long as a physical length of the display in the one dimension and, responsive to an actuation of a predetermined input member of the I/O apparatus, outputting on the display an interaction component having at least one field that comprises an alterable element of an alarm An improved electronic device 4 is indicated generally in FIG. 1 and is depicted schematically in FIG. 2. The exemplary embodiment depicted herein of the electronic device 4 is that of a handheld electronic device, but it is understood that the teachings herein can be applied to any type of electronic device, such as wristwatches, .mp3 players, "smart phones," and any other type of electronic device without limitation. The exemplary electronic device 4 includes a housing 6 upon which are disposed an I/O apparatus 10 and a processor apparatus 16. The exemplary I/O apparatus 10 comprises an input apparatus 8, an RF apparatus 11, and an output apparatus 12. The input apparatus 8 is structured to provide input to the processor apparatus 16, and the output apparatus 12 is structured to receive output signals from the processor apparatus 16. The RF apparatus 11 comprises an RF transceiver 13 and an RF transceiver 14 and is structured to enable wireless communications between electronic device 4 and a wireless communication system 15, such as is depicted generally in FIG. 2. The RF apparatus 11 may be referred to herein as a "radio", although such a reference is not intended to imply the presence of only a single transceiver. The output apparatus 12 comprises a display 18 that is structured to provide visual output, although other output devices such as speakers, LEDs, tactile output devices, vibration motors, and so forth can be additionally or alternatively used.

As can be understood from FIG. 1, the input apparatus 8 may include a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of linguistic elements assigned thereto, with at least some of the linguistic elements being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

One of the keys 28 may be an <ESCAPE> key 31 which, when actuated, provides to the processor apparatus 16 an input that undoes the action which resulted from the immediately preceding input and/or moves to a position logically higher within a logical menu tree managed by a graphical user interface (GUI) routine 46. The function provided by the <ESCAPE> key 31 can be used at any logical location within any portion of the logical menu tree except, perhaps, at a home screen such as is depicted in FIG. 1 as being output on the display 18. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Figure 17:
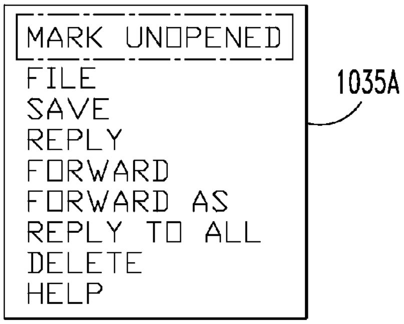
FIG. 17 depicts an exemplary menu that can be output on the display.

Another of the keys 28 may be a <MENU> key 33 which, when actuated, provides to the processor apparatus 16 an input that causes the GUI 46 to generate and output on the display 18 a menu such as is depicted in FIG. 17, which will be discussed in greater detail below. Such a menu is appropriate to the current logical location within the logical menu tree, as will be likewise described in greater detail below.

While in the depicted exemplary embodiment the multiple-axis input device is the track ball 32, it is noted that multiple-axis input devices other than the track ball 32 can be employed without departing from the present concept. For instance, other appropriate multiple-axis input devices can include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by a number of routines as inputs such as, for example, navigational inputs, scrolling inputs, selection inputs, and other inputs. As employed herein, the expression "a number of" and variations thereof shall refer broadly to any non-zero quantity, including a quantity of one.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that can be employed on the electronic device 4. As such, mechanical alternatives to the track ball 32, such as a joystick, may have a limited rotation with respect to the housing 6, and non-mechanical alternatives may be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 can be translated in such a fashion by, for example, an application of an actuating force to the track ball 32 in a direction toward the housing 6, such as by pressing on the track ball 32. The inputs that are provided to the processor apparatus 16 as a result of a translation of the track ball 32 in the indicated fashion can be employed by the routines, for example, as selection inputs, delimiter inputs, termination inputs, or other inputs without limitation.

Figure 2:
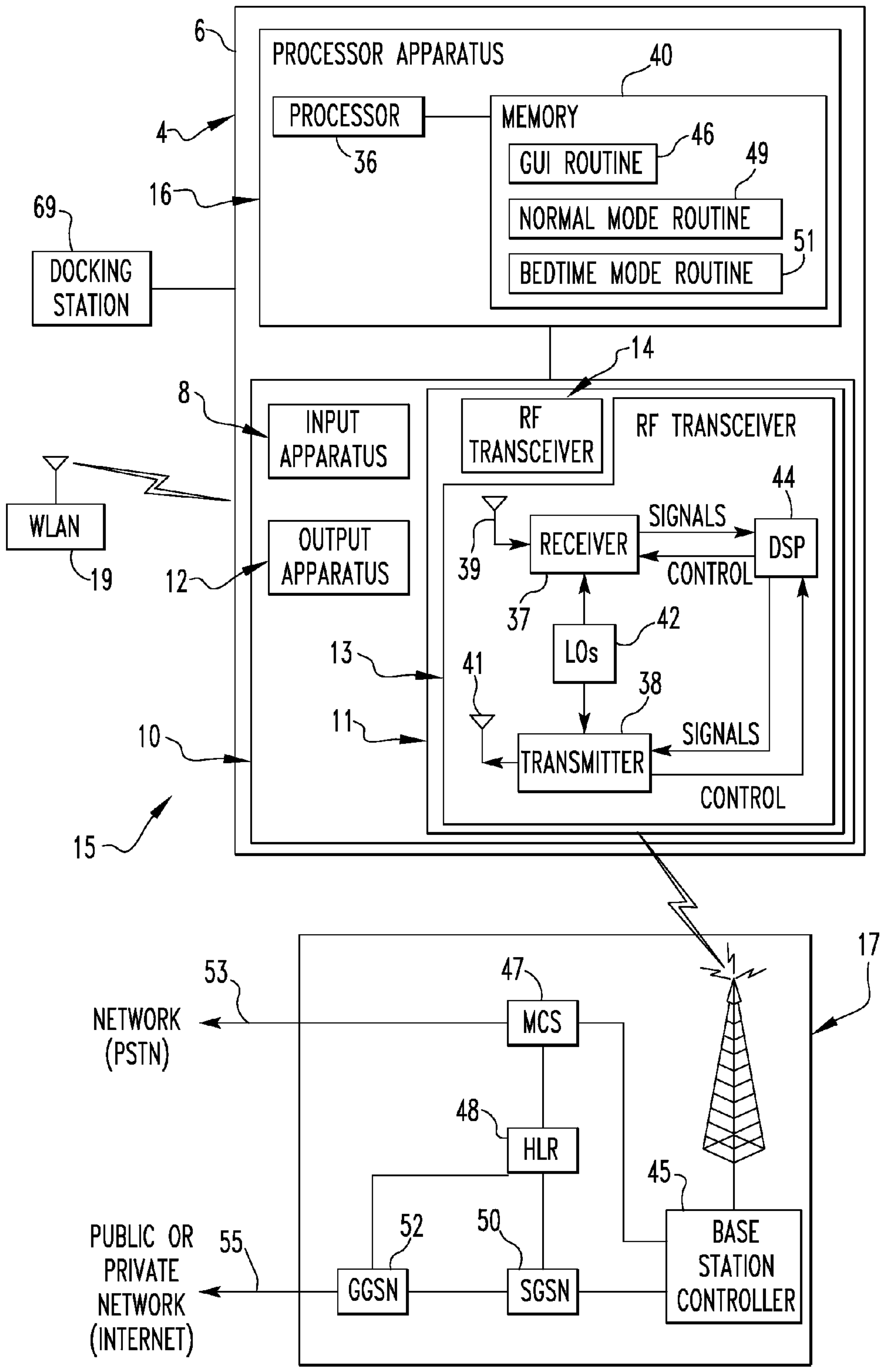
FIG. 2 is a schematic depiction of the electronic device of FIG. 1 in an environment.

As can be seen in FIG. 2, the processor apparatus 16 comprises a processor 36 and a memory 40. The processor 36 may be, for instance and without limitation, a microprocessor (μP) that is responsive to inputs from the input apparatus 8, that provides output signals to the output apparatus 12, and that receives signals from and sends signals to the RF apparatus 11. The processor 36 interfaces with the memory 40.

The memory 40 can be said to constitute a machine-readable medium and can comprise any one or more of a variety of types of internal and/or external storage media such as, without limitation, RAM, ROM, EPROM(s), EEPROM(s), FLASH, and the like that provide a storage register for data storage such as in the fashion of an internal or external storage area of a computer, and can be volatile memory or nonvolatile memory. The memory 40 has stored therein the aforementioned number of routines which are executable on the processor 36. The routines can be in any of a variety of forms such as, without limitation, software, firmware, and the like. As will be explained in greater detail below, the routines include the aforementioned GUI 46, as well as other routines which may include a NORMAL mode routine 49 and a BEDTIME mode routine 51, a spell checking routine, a disambiguation routine, and other routines, by way of example.

As mentioned above, the routines that are stored in the memory 40 and that are executable on the processor 36 include the NORMAL mode routine 49 and the BEDTIME mode routine 51, and these are part of an improved clock feature that is advantageously provided on the electronic device 4. As will be set forth in greater detail below, the improved clock feature provides a NORMAL mode of operation for use typically during waking hours. The improved clock feature advantageously additionally provides a BEDTIME mode of operation which typically will be employed during the sleeping hours of the user, i.e., during the night or during other times of sleep. Also, the improved clock feature may advantageously provide a STANDBY mode of operation wherein, as will be sort forth in greater detail below, one or more clocks are output on the display 18. The clock feature may additionally provide an improved alarm clock function. Moreover, the clock feature may provide an improved time zone management function.

The NORMAL mode of operation, also referred to herein as the NORMAL mode, is the mode in which the electronic device 4 typically operates when the user is often awake, i.e., during the day and the evening or at other times when the user is not sleeping or trying to sleep. FIG. 1 generally depicts the electronic device 4 in the NORMAL mode. For example, the display 18 has output thereon a home screen which comprises a number of visual objects representative of selectable icons. The home screen additionally depicts with another visual object a clock 54 which indicates a current time of the electronic device 4. The electronic device 4 further includes an indicator 56 disposed on the housing 6 and which provides visual notifications such as through the use of a light source which can be an LED, for example, or another appropriate light source. In response to one or more predetermined events, such as an incoming email message or an incoming telephone call or other events, visual alerts of these events can be provided with the display 18 or with the indicator 56 or with both. The electronic device 4 additionally includes a loudspeaker (not expressly depicted in the figures) which, for instance, may provide audio alerts in response to predetermined events such as the aforementioned incoming email or telephone call or other predetermined events. The electronic device further includes a vibration motor (not expressly depicted in the figures) that may provide tactile alerts in response to the aforementioned incoming email message or telephone call or other predetermined events.

As a general matter, the electronic device 4 can be configured by the user such that any combination of visual, audio, and tactile alerts can be assigned to any type of predetermined event. For instance, the user may set up a number of profiles, and each profile will establish the particular types of alerts that will be presented to the user in response to occurrences of one or more predetermined events. As such, an occurrence of any type of predetermined event will result in the outputting of a particular type of alert, i.e., a visual alert, an audible alert, and a tactile alert, alone or in any combination, depending upon which profile is active at the time of the predetermined event. When the NORMAL mode is operational, all such alerts are enabled, meaning that upon an occurrence of any particular predetermined event, the type of alert assigned to the particular predetermined event will be generated and will be output.

In the NORMAL mode the RF apparatus 11 is operational and enables wireless communication between the electronic device 4 and the wireless communication system 15. As shown in FIG. 2, the electronic device 4 is adapted to communicate with a wireless communication network 17 which is a cellular telecommunications network (which may be referred to as a wireless wide area network or "WWAN") in the present example. Also, the electronic device 4 may be adapted to communicate with a wireless local area network or "WLAN" 19 such as an IEEE 802.11-based wireless network. For wireless communication with the wireless communication network 17, the electronic device 4 utilizes the RF transceiver 13. For wireless communication with the WLAN 19, the electronic device 4 utilizes the RF transceiver 14 for IEEE 802.11-based communications.

The RF transceiver 13 is depicted in detail (schematically) in FIG. 2 whereas for the sake of simplicity the RF transceiver 14 is depicted in a more simplistic fashion in FIG. 2, it being noted that the RF transceiver 13 and the RF transceiver 14 are of substantially the same configuration. Although the RF transceiver 13 and the RF transceiver 14 are shown in FIG. 2 as being separate devices, some components of these otherwise separate transceivers may be shared where possible.

With such a configuration, the electronic device 4 may be referred to as a "dual mode" communication device. In an alternate embodiment, the electronic device may have only a single transceiver that is operative in only one of the different types of networks.

The RF transceiver 13 comprises a receiver 37, a transmitter 38, and associated components, such as one or more (which may be embedded or internal) antenna elements 39 and 41, a number of local oscillators (LOs) 42, and a processing module such as a digital signal processor (DSP) 44. As will be apparent to those skilled in the field of communications, the particular design of the RF transceiver 13 depends upon the communication network in which the electronic device 4 is intended to operate.

The electronic device 4 sends communication signals to and receives communication signals from wireless communication links of the wireless communication system 15 via the RF transceiver 13. For instance, the electronic device 4 may send and receive communication signals via the RF transceiver 13 through the wireless communication network 17 after required network procedures have been completed. Signals received by the antenna element 39 through the wireless communication network 17 are input to the receiver 37, which may perform such receiver functions as signal amplification, frequency down conversion, filtering, channel selection, and the like and, in the example shown in FIG. 2, analog-to-digital (A/D) conversion. A/D conversion of a received signal allows more complex communication functions such as demodulation and decoding to be performed in the DSP 44. In a similar manner, signals to be transmitted are processed, including modulation and encoding, for example, by the DSP 44. These DSP-processed signals are input to the transmitter 38 for digital-to-analog (D/A) conversion, frequency up conversion, filtering, amplification and transmission over the wireless communication network 17 via the antenna element 41. The DSP 44 not only processes communication signals, but also provides for control of the receiver 37 and the transmitter 38. For example, the gains applied to communication signals in the receiver 37 and transmitter 38 may be adaptively controlled through automatic gain control algorithms implemented in the DSP 44.

It is reiterated that the RF transceiver 14 has a configuration similar to that of the RF transceiver 13 as described above. Likewise, communications between the electronic device 4 and the WLAN 19 occur via the RF transceiver 14 in a fashion similar to that set forth above between the RF transceiver 13 and the wireless communication system 15.

The RF transceiver 13 performs functions similar to those of a base station controller 45 of the wireless communication network 17, including for example modulation/demodulation and possibly encoding/decoding and encryption/decryption. In the embodiment of FIG. 2, wireless communications are configured in accordance with Global Systems for Mobile communications (GSM) and General Packet Radio Service (GPRS) technologies. However, any suitable types of communication protocols may be utilized. For example, the network may be based on one or more of Evolution Data Only (EV-DO), code division multiple access (CDMA), CDMA2000, Universal Mobile Telecommunications System (UMTS), Enhanced Data rates for GSM Evolution (EDGE), High-Speed Packet Access (HSPA), High Speed OFDM Packet Access (HSOPA), etc.

In this embodiment, the wireless communication network 17 includes the base station controller (BSC) 45 with an associated tower station, a Mobile Switching Center (MSC) 47, a Home Location Register (HLR) 48, a Serving GPRS Support Node (SGSN) 50, and a Gateway GPRS Support Node (GGSN) 52. The MSC 47 is coupled to the BSC 45 and to a landline network, such as a Public Switched Telephone Network (PSTN) 53. The SGSN 50 is coupled to the BSC 45 and to the GGSN 52, which is in turn coupled to a public or private data network 55 (such as the Internet). The HLR 48 is coupled to the MSC 47, the SGSN 50, and the GGSN 52.

Although the depicted exemplary embodiment relates to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network. The communications may alternatively be adapted in accordance with BLUETOOTH™ standards (e.g. the BLUETOOTH™ standards may be based on BLUETOOTH™ Specification Version 2.0, Volumes 1 and 2).

The improved BEDTIME mode of operation, also referred to herein as the BEDTIME mode, provides numerous features which can be employed in various combinations to provide a mode of operation that is configured to be non-distracting to a user during the times of bedtime or sleep, i.e., to be conducive to sleep by a user of an electronic device 4. It is expressly noted that the BEDTIME mode can be advantageously employed by the user during non-nighttime hours, i.e., during daylight hours, such as if the user works an evening or night shift and sleeps during the day, or in other circumstances. Execution of the BEDTIME mode routine 51 activates the BEDTIME mode. The BEDTIME mode routine 51 can itself be triggered by any of a number of predetermined events. As such, the occurrence of any of a number of predetermined events can automatically cause activation of the BEDTIME mode because it triggers execution of the BEDTIME mode routine 51.

The BEDTIME mode routine 51 performs operations comprising but not necessarily requiring suspending one or more types of alerts, e.g., notifications, that will otherwise be output in response to an occurrence of a predetermined event, i.e., an occurrence subsequent to the activating of the BEDTIME mode. The BEDTIME mode may also suspend alerts that are being output at the time of execution of the BEDTIME mode routine 51. For example, a visual alert or other alert being output in NORMAL mode may be suspended upon execution of the BEDTIME mode routine 51. Typically, the operations of the BEDTIME mode routine 51 will comprise a suspension of all types of alerts, although this need not necessarily be the case. For instance, email alerts may be suspended by ceasing GPRS communications of the RF apparatus 11, whereas telephone-based alerts may be suspended by ceasing GSM communications of the RF apparatus 11. As such, the suspension of GPRS communications while allowing GSM communications will, in effect, suspend email-based alerts but will allow telephone-based alerts such as alerts resulting from incoming telephone calls.

In suspending one or more types of alerts, the BEDTIME mode routine 51 may override in whole or in part the alarm settings of any profile that is currently active or that becomes active on the electronic device 4. For instance, a given profile that has been set up by the user may be a "loud" profile that establishes the volume and duration of, for example, an alert that is generated in response to a predetermined event. If the "loud" profile is active at the time when the BEDTIME mode routine 51 is activated, the effect of the BEDTIME mode routine 51 may be to override some or all of the alarm portions of the "loud" profile.

It is also noted that the BEDTIME mode can itself be customized by the user to, for example, enable certain types of alarms to be output, i.e., not suspended, during operation of the BEDTIME mode. Such a customization may be in the nature of a partial override of the BEDTIME mode. For instance, the user may be awaiting a telephone call from a particular other person. If the BEDTIME mode is customized to accept telephone calls originating from a particular telephone number or from a particular contact in an address book, this may result in the usual visual alert, audio alert, tactile alert, or a combination thereof, being output in response to an incoming telephone call that originates from that particular telephone number. Telephone calls originating from other telephone numbers or other contacts will not result in an alert. Other types of customization of the BEDTIME mode can be employed without departing from the present concept.

The BEDTIME mode routine 51 also performs operations comprising but not necessarily requiring suspending some or all wireless communications on the electronic device 4, such as through turning off or otherwise disabling some or all of the RF apparatus 11. As is generally understood, a wireless transceiver of an electronic device can, during radio transmission therefrom, unintentionally induce noise in loudspeakers of other electronic devices that are nearby. For example, a cellular telephone placed near a transistor radio can induce an amount of audible static on the loudspeaker of the transistor radio when the cellular telephone is transmitting. Since devices which employ cellular technologies typically periodically send a transmission to an appropriate cellular network tower, for example, in order to maintain communications therewith, such periodic transmissions can cause the unintentional generation of audible static on a nearby transistor radio or other electronic device, for example. Advantageously, therefore, the RF apparatus 11 of the electronic device 4 may be disabled in whole or in part by the BEDTIME mode routine 51, thereby avoiding the unintentional generation of audible noise on the loudspeakers of nearby electronic devices.

The disabling of the RF apparatus 11 or the disabling of certain types of alerts or both can be arranged to provide many types of desirable configurations of the BEDTIME mode. For instance, the RF apparatus 11 can remain enabled, but all visual and audio alerts can be disabled. This will enable incoming communications, such as incoming telephone calls and email messages, for example, to be received on the electronic device 4 without providing a visual or audio notification to the user. Depending upon the configuration of the various alerts on the electronic device 4, this may have much the same effect as disabling the RF apparatus 11 since visual and audio notifications of incoming communications are not being provided. However, the disabling of visual and audio alerts will not necessarily result in the disabling of tactile alerts. As such, if certain predetermined events such as incoming telephone calls from certain individuals or high priority email communications also have assigned thereto a tactile alert, the occurrence of such a predetermined event will result in a tactile alert being provided to the user.

As mentioned above, in certain circumstances the BEDTIME mode may be customized to only partially disable the radio. For instance, and depending upon applicable wireless transmission protocols, the radio suspension may be customized such that only outgoing radio transmission may be suspended. Similarly, the BEDTIME mode may be customized by the user to continue to enable GSM communications and to continue to receive Global Positioning System (GPS) signals, but to disable GPRS communications. Such a configuration will allow incoming and outgoing telephone calls via GSM, but will not allow GPRS functions such as are provided by WAP, SMS, and MMS services. By allowing the receipt of GPS signals during operation of the BEDTIME mode, such a configuration will also detect, for instance, a change in location such as is indicated by a change in time zone. A similar benefit can be obtained by allowing Wi-FiR communications while suspending other types of communications.

Figure 3:
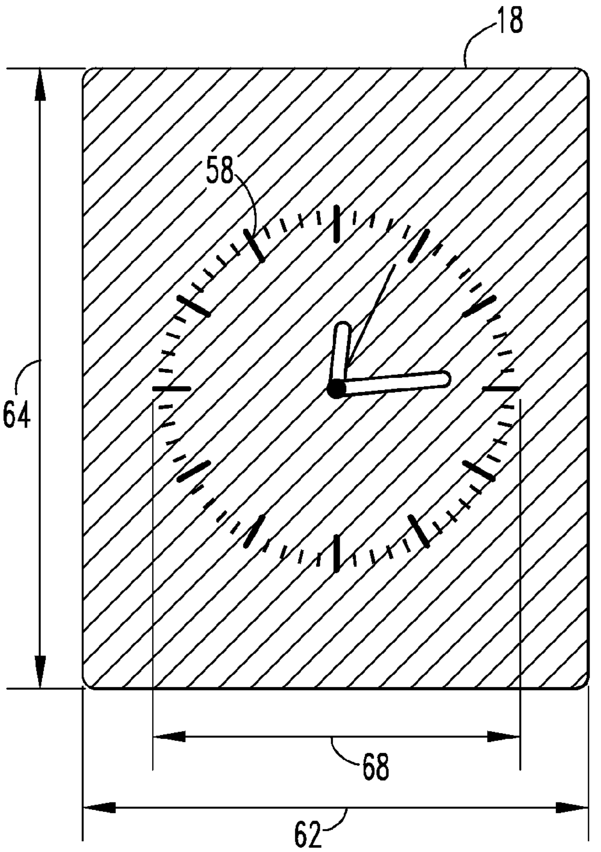
FIG. 3 depicts an exemplary output on a display of the electronic device of FIG. 1.

The BEDTIME routine 51 also performs operations comprising but not necessarily requiring outputting a current time by generating and outputting on the display 18 a visual object representative of a clock. Advantageously, and as can be seen in FIG. 3, a clock 58 in the BEDTIME mode occupies a substantial portion of the display 18 and is larger than the clock 54 that is displayed in the NORMAL mode of FIG. 1. For example, in a horizontal direction the clock 58 has a horizontal dimension that is represented at the numeral 68. The display 18 has a physical dimension measured in the horizontal direction that is represented at the numeral 62 and also has a physical dimension in a vertical direction that is represented at the numeral 64. The horizontal dimension of the clock 68 in the exemplary embodiment depicted herein is well over one-half of the horizontal physical dimension 62 of the display 18. While in other embodiments the clock 58 can occupy relatively larger or smaller portions of the display 18 than that depicted herein, the clock 58 will as a general matter have a dimension in at least one direction that is at least about one-half of the physical dimension of the display in the same direction. As a general matter, therefore, the clock 58 in the BEDTIME mode will typically be the largest visual object that is being output on the display 18, thus making it readily recognizable by a user during the night and also making the time thereof readily understandable to the user in a similar fashion. Moreover, the clock 58 in the BEDTIME mode will typically be centrally located on the display 18 either in the horizontal direction or in the vertical direction or both, which is different than the clock 54 of the NORMAL mode which is disposed generally at an edge of the display 18, thus further enhancing the prominence of the clock 58 in the BEDTIME mode. That is, the clock 54 in the NORMAL mode is depicted as, for instance, a visual element that is at most of an importance that is equal to other visual elements on the display 18, whereas the clock 58 in the BEDTIME mode is configured to be the most visually dominant visual element on the display 18. As a further enhancement, clocks can be displayed either in an analog or a digital form, and can be output in 12-hour or 24-hour formats.

The BEDTIME mode routine 51 may additionally initiate operations comprising but not necessarily requiring illuminating the display 18 or the keypad 24 or both at a very low non-zero level of illumination. In one exemplary embodiment, the display 18 is at a very low non-zero level of illumination while the keypad 24 is at a substantially zero level of illumination. A low level of illumination not only avoids presenting a distraction to the user but also is a level of illumination that is appropriate to low light conditions, such as when the eyes of a user have become accustomed to the ambient illumination of a dark room. In the exemplary embodiment depicted herein, FIG. 3 is intended to depict the clock 58 as being a white analog clock face on a black background, although it can be depicted as being a digital clock or as having a combination of analog components and digital components without departing from the present concept. It is noted, however, that various colors and color combinations, and combinations of brightness, as well as themes, animations, etc. without limitation can be employed without departing from the present concept. The exemplary clock face of the clock 58 includes an hour hand, a minute hand, and a second hand, along with graduations about the circumference of the clock face, all of which are white, with the white element being separated from one another with black elements of the clock 58. The exemplary white regions that are output on the display 18, i.e., the hour, minute, and second hands and the graduations, occupy a relatively small region of the display 18 when compared with the black regions of the clock 58 and the rest of the display 18. The area of the display 18 under illumination in FIG. 3, i.e., the white elements, is thus a relatively small portion of the display 18. In the BEDTIME mode, therefore, the low level of illumination of the illuminated portions of the display 18 results in a very subtle lighting effect which can be seen by a user when desired but which is of a sufficiently low light intensity that it is not distracting to a user during the night. By way of example, the level of illumination during the BEDTIME mode is typically at most about a few percent of a conventional or full illumination that is applied to the display 18 during operation of the NORMAL mode. Such a low level of illumination during the BEDTIME mode is particularly effective since the clock 58 is the largest object that is visually output on the display 18. For the sake of completeness, it is noted that the illumination levels employed during the NORMAL mode, the BEDTIME mode, and any other modes are customizable by the user.

As mentioned above, numerous predetermined events can trigger the execution of the BEDTIME mode routine 51 which activates the BEDTIME mode. For instance, the BEDTIME mode routine 51 can be triggered if the alarm clock function is switched to an ON condition, i.e., from an OFF condition. In this regard, and as will be set forth in greater detail below, another selectable condition is a WEEKDAYS condition which is a special type of ON condition, i.e., it is an ON condition that is effective on weekdays, i.e., Monday through Friday, inclusive.

The triggering of the BEDTIME mode in such a fashion may not result in an instantaneous execution of the BEDTIME mode routine 51. Rather, such triggering may result in a slightly delayed execution the BEDTIME mode routine 51, the delay being fifteen seconds or another appropriate delay time, along with an outputting of a message on the display such as “ENTERING BEDTIME MODE—PRESS ANY KEY TO SUSPEND INITIATION OF THE BEDTIME MODE”. If a keystroke is detected within the delay time, the BEDTIME mode routine 51 will not be executed and rather will be delayed until later. If no such keystroke is detected within the delay time, the BEDTIME mode routine 51 will be executed. Optionally, the triggering of the BEDTIME mode in such a fashion may not result in an instantaneous execution of the BEDTIME mode routine 51, and rather may result in an outputting of a prompt such as “DO YOU WANT TO ENTER THE BEDTIME MODE” which would initiate the BEDTIME mode routine 51 if an affirmative input is detected in response to the prompt. Optionally, the triggering of the BEDTIME mode routine 51 by the alarm clock function being placed in the ON condition can additionally or alternatively be limited to those situations in which an alarm time is within a predetermined period of time from the current time, i.e., twenty-four hours, for example.

The BEDTIME mode routine 51 may also be triggered by the connecting of the electronic device 4 with another device, such as by connecting the electronic device 4 with a docking station 69, such as is depicted in a schematic fashion in FIG. 2, or by connecting the electronic device to a personal computer or a charging device via a USB cable, or in other fashions.

The triggering of the BEDTIME mode routine 51 upon connecting the electronic device 4 with another device can optionally be limited to those situations wherein the electronic device 4 is connected with a specific other device, e.g., a docking station on a table at a user's home or hotel room as opposed to a docking station or a USB charging cable at a user's workplace. The electronic device 4 can ascertain the identity of the device to which it is being connected in any of a variety of well understood fashions. One way to distinguish the identity of the device to which the electronic device 4 is being connected is to determine the way in which charging of the electronic device 4 is being accomplished. For instance, if charging of the electronic device 4 occurs via a USB port on the housing 6, this can indicate one type of connection, whereas charging using a number of dedicated connectors on the bottom of the housing 6 will indicate a connection with, say, a docking station, i.e., a docking station at a BEDTIME. Another way to distinguish the identity of the device to which the electronic device 4 is being connected is to employ one or more magnetic sensors on the electronic device or on the device to which it is being connected or both. Another way to distinguish the identity of the device to which the electronic device 4 is being connected is to implement near field communication (NFC) technologies which employ short-range high-frequency wireless communications to exchange data, such as an exchange of data between the electronic device 4 and the device to which it is being connected. Another way to distinguish the identity of the device to which the electronic device 4 is being connected is to detect the orientation of the electronic device 4 with respect to a reference, such as with respect to gravity. For instance, a number of accelerometers or other sensors may be employed to detect when the electronic device 4 is in a particular orientation with respect to a reference such as the vertical direction, with the electronic device 4 being situated in such an orientation when it is disposed, for example, atop the docking station 69.

The triggering of the BEDTIME mode routine 51 upon connecting the electronic device 4 with another device can optionally be limited to those situations wherein the connection between the electronic device 4 and the other device is an operative connection, meaning that either the electronic device 4 or the device to which it is being connected or both provides some operational effect to the other device. For instance, the connecting of the electronic device 4 with a USB charging cable connected with a personal computer may have the operative effect of charging the electronic device and of enabling synchronization between the electronic device 4 and the personal computer. On the other hand, the receiving of the electronic device 4 in a case or holster is an event that may be recognized by the electronic device 4, but it may also be the case that such connection with the holster has no operative effect and therefore does not trigger the execution of the BEDTIME mode routine 51. Similarly, the connection of the electronic device 4 to a USB charging cable may have the effect of charging the device without involving any other meaningful operational effect on the electronic device 4.

One way in which the electronic device 4 can, for instance, distinguish between a USB connection with a PC and a connection with a USB charging cable is by awaiting a USB enumeration by the device that is connected with the electronic device 4. If the connected device intends to communicate with the electronic device 4, the connected device will perform a USB enumeration within a certain period of time soon after making the connection. Thus, when connecting the electronic device 4 with another device that can be any one of many devices, initiation of the BEDTIME mode will be delayed at least temporarily to await a USB enumeration by the connected device, which will enable the electronic device 4 to identify the connected device and determine its possible future actions such as synchronization, etc. If after a certain period of time no USB enumeration has occurred, BEDTIME mode may be initiated.

The electronic device 4 can also employ a unique identifier with may be stored in a persistent store on the connection device and which distinguishes the connected device from other devices. By way of example, the electronic device 4 may be operatively connected to any of a plurality of other devices, such as an office cradle, a bedside charging pod, a kitchen charging pod, a BluetoothR car kit, and a bicycle cradle, etc. Such connected devices may or may not be further connected to a PC. For example, while the office cradle may be further connected to a PC, the bedside charging pod may not be connected to a PC. In one embodiment, a unique identifier for a given connected device may be provided by the manufacturer and may comprise a product serial number, for example. In another embodiment, a given connected device may be initially configured by pushing a unique identifier from the electronic device 4 to the connected device. The unique identifier may be transmitted via any of a number of communication channels, such as USB, Bluetooth®, etc. The unique identifier can be configured to be associated with one or more customizable settings that control the mode of operation. The unique identifier of the connected device can thus be used to determine whether to trigger the BEDTIME mode routine 51 upon pairing between the electronic device and the connected device. The detection by the electronic device 4 of the unique identifier stored in a persistent store of the connected device enables the electronic device 4 to affirmatively identify a specific connected device from among a plurality of similar devices and other devices, and enables the operation according to the one or more settings associated with that unique identifier. This enables the BEDTIME mode routine 51 to be configured for triggering upon connection of the electronic device 4 with a specific other device as opposed to an otherwise similar other device. For example, upon detecting a pairing of the electronic device 4 with the bedside cradle as identified by its unique identifier, the BEDTIME mode routine 51 may be triggered, causing alerts to be suspended, wireless communications to be disabled, and illumination level of the display to be lowered; however, upon detecting a pairing of the electronic device 4 with the office cradle as identified by its unique identifier, the current time may be displayed, but alerts are not suspended, wireless communications are not disabled, and illumination level of the display is not lowered.

The BEDTIME mode routine 51 may also be triggered upon the reaching of a preset time, i.e., wherein the current time is equal to a preset time. For instance, the user may set up the electronic device 4 such that the BEDTIME mode routine 51 is automatically triggered at, for instance, 11:30 PM. In such a circumstance, the electronic device 4 will at 11:30 PM automatically trigger the execution of the BEDTIME mode routine 51, thereby activating the BEDTIME mode. If the electronic device 4 happens to be in use at such a time, the GUI routine 46 will optionally initiate a dialog with the user requesting to know if the scheduled activation of the BEDTIME mode should be delayed or suspended, for instance. By way of example, a notification such as "ENTERING BEDTIME MODE—PRESS ANY KEY TO SUSPEND INITIATION OF THE BEDTIME MODE" may be output on the display 18 advising the user that the device is entering BEDTIME mode and informing the user to actuate any key if such a mode change is not desired.

Also, the triggering of the BEDTIME mode routine 51 may be conditioned upon both the reaching of a preset time plus the connection of the electronic device 4 with a predetermined other device. For instance, the user may set up the electronic device 4 such that the BEDTIME mode routine 51 is automatically triggered at 11:30 PM but only if it is also connected with a docking station at the user's bedside. Other such combinations among the triggering events described herein can be envisioned.

The BEDTIME mode routine 51 may also be executed by being manually selected by the user, such as if the user was to select a particular item on a menu or was to select an icon on the display 18, either of which when selected will cause execution of the BEDTIME mode routine 51. Similarly, the BEDTIME mode routine may be executed upon detection of a specific "hot key" input, which might be an actuation of a specific individual key 28, such as actuation of the <B> key 28 by way of example, or a specific actuation sequence of a number of keys 28 or other input elements of the input apparatus 8. Other predetermined events not expressly mentioned herein can be employed to trigger the execution of the BEDTIME mode routine 51 without departing from the present concept.

Figure 4:
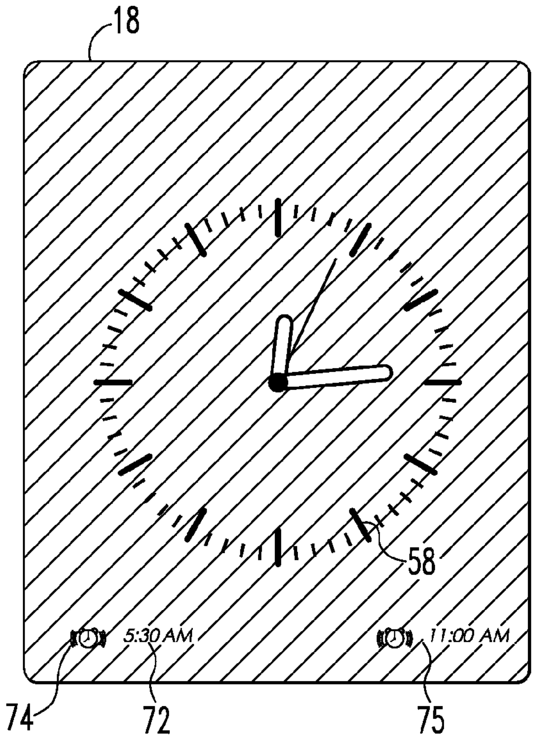
FIG. 4 depicts another exemplary output on the display.

As can be seen in FIG. 4, the alarm clock function also may advantageously provide an indication to the user that the alarm clock function is in an ON condition by outputting on the display 18 an alarm time 72, i.e., "5:30 AM", with the use of a visual object additional to that of the clock 58. That is, the displaying of the alarm time 72 itself provides the indication that the alarm clock function is in an ON condition and can likewise by itself indicate the time at which the alarm is scheduled to occur. Advantageously, therefore, at a glance the user can both ascertain that the alarm clock function is in an ON condition and can ascertain the time at which the alarm is set to occur, which requires minimal visual and mental effort by the user.

In the exemplary embodiment depicted in FIG. 4, the visual object that displays the alarm time 72 additionally includes an optional feature 74 which visually depicts an image of a ringing clock adjacent the alarm time 72 itself. Such optional feature 74 can be employed to provide additional confirmation for users who are unfamiliar with the alarm clock function or who potentially may be confused at night between which visual object represents the alarm time and which represents the current time or a secondary time on the display 18. As mentioned above, however, the feature 74 is completely optional, it being reiterated that the outputting of the alarm time 72 itself is what serves as the indication to the user that the alarm clock function is in an ON condition and likewise indicates the time at which the alarm will occur.

Also optionally, the alarm clock function may advantageously provide on the display 18 an indication of another alarm. For instance, the display 18 may further include another alarm time 75, i.e., "11:00 AM", with the use of a visual object additional to that of the clock 58 and that of the alarm time 72. Such other alarm time 75 provides to the user an indication that the alarm clock function is in an ON condition with respect to another time. That is, the alarm clock function may concurrently output a plurality of times at which alarms are scheduled to sound, which can be helpful in providing a subtle reminder of future events.

It is noted that the outputting on the display 18 of the alarm time 72 may itself be conditioned upon the alarm time being within a predetermined period of time of the current time, i.e., within twenty-four hours, for instance. In such a situation, therefore, the outputting of the alarm time 72 can thus be conditioned upon both the alarm clock function being in an ON condition and the alarm time being within the predetermined period of time of the current time. As such, it may be the case that the alarm clock function is in an ON condition, but the alarm time is farther away from the current time than the predetermined period of time. In such a situation the alarm time 72 may not be output on the display 18. However, once the set alarm time comes within the predetermined period of time, the alarm time 72 will be output on the display 18 with the use of the aforementioned visual object. Similarly, instead of the alarm time coming within the predetermined period of time, the alarm time can be changed by the user, i.e., advanced to an earlier time that is within the predetermined period of time, thus likewise triggering the outputting of the alarm time 72 on the display 18.

It is also expressly noted that the displaying of the alarm time is not limited to alarm clock functions that are operable in conjunction with the BEDTIME mode. Rather, any alarm time can be output on the display 18 in any operational mode of the electronic device 4. Thus, and by way of example, the time associated with any type of calendar event, such as a calendar entry reflecting a scheduled meeting or a reminder, can be output on the display 18 as a "next alarm time". Therefore, a "next alarm time" can be output at many times during the day. For instance, a "wake up" alarm time can be output during operation of the BEDTIME mode. Once the "wake up" alarm has been processed, i.e., has provided its alarm and has been switched off by the user, the first scheduled meeting of the day may have its starting time output as a "next alarm time" on the display. After the scheduled start time of the meeting, a scheduled lunch appointment may be output as a "next alarm time" and so forth. Also, and as mentioned above, multiple alarm times can be output concurrently on the display 18. It thus can be seen that any type of scheduled event may have its alarm time output on the display 18 as a "next alarm time" in any mode of operation of the electronic device 4.

A indicated above, the improved clock feature may advantageously provide a STANDBY mode of operation that is initiated during the NORMAL mode of operation after expiration of a predetermined period of time wherein no input is received from the input apparatus 8. In the STANDBY mode the display 18 is made to appear much like it does in the BEDTIME mode, i.e., it displays a large clock, a secondary time as appropriate, and a "next alarm time" if one exists. However, in the STANDBY mode neither the radio nor the notifications are disabled or suspended, and while the illumination of the display 18 may be somewhat reduced in brightness from its conventional brightness, the display 18 will still have a substantial level of illumination in order to enable it to be seen during ordinary daytime operations. An actuation of the <ESCAPE> key 31 will result in exiting the STANDBY mode and returning to the NORMAL mode. Advantageously, and as will be set forth in greater detail below, an actuation of the track ball 32, such as a translation of the track ball 32 in a direction toward the housing 6, in either the STANDBY mode or the BEDTIME mode will result in the opening of an alarm setting dialog which enables the user to create a new alarm or to edit an existing alarm.

As mentioned above, the improved clock feature may provide a time zone management function. As a general matter, the time zone management function enables the management of multiple applicable times that will exist when moving the electronic device 4 from a first time zone where a home time is prevalent to a second time zone where a different, local time is prevalent. In one aspect of the time zone management function, when the electronic device 4 detects that it has been moved from one time zone to another, the time zone management function advantageously initiates a dialog using the GUI routine 46 to output on the display 18 a first dialog 76 such as is depicted generally with a window in FIG. 5A. Such a change in time zone can be determined through communication of the RF apparatus 11 with, for instance, existing cellular networks or Wi-Fi® networks, for example. A change in time zone may also be detected through the receipt of GPS data. The BEDTIME mode of operation may be configured to provide continued reception of GPS data, and in a situation wherein the BEDTIME mode of operation is active and a change in time zone is detected, the first dialog 76 can be output on the display 18 in place of the clock 58, for example. In this regard, it is noted that an occurrence of a time zone change typically will occur when a user is not asleep, the operation of the BEDTIME mode notwithstanding.

Figure 5A:
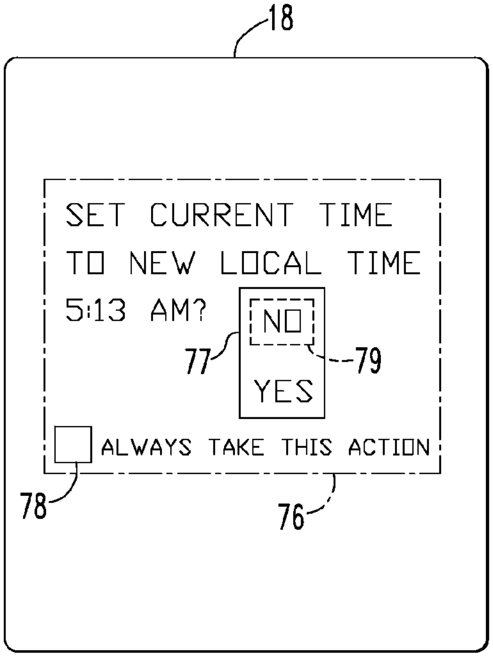
FIG. 5A depicts another exemplary output on the display.

The first dialog 76 in FIG. 5A inquires whether the current time should be changed to reflect the new local time. The first dialog 76 includes a decision box 77 providing the alternative choices "NO" and "YES", along with a cursor 79 which can be manipulated to selectively highlight either choice. If an affirmative input, i.e., "YES," is detected by the processor apparatus 16 in response to the query of the first dialog 76, the time zone management function will cause the GUI routine 46 to output on the display 18 a second dialog 80, as is indicated generally with a window at FIG. 5B. Such an affirmative selection input in FIG. 5A can be identified from, for instance, a detection of a scrolling input from the track ball 32 in a downward navigational direction which will cause the cursor 79 to highlight the choice "YES", and a detection of an actuation of the track ball 32 such as from it being translated inwardly toward the housing 6 to provide a selection input. Other selection methodologies will be apparent.

The first dialog 76 also includes a selectable box 78 that is associated with the user option "ALWAYS TAKE THIS ACTION" which, if selected in conjunction with a YES response, i.e., a selection of the YES alternative, will result in the current time automatically being changed to reflect the new local time upon detecting a change in time zone, i.e., the change will occur without the outputting of the first dialog 76. If selected in conjunction with a negative response, i.e., a selection of the NO alternative, the current time may never be automatically changed to reflect the new local time responsive to a detection of a change in time zone.

Figure 5B:
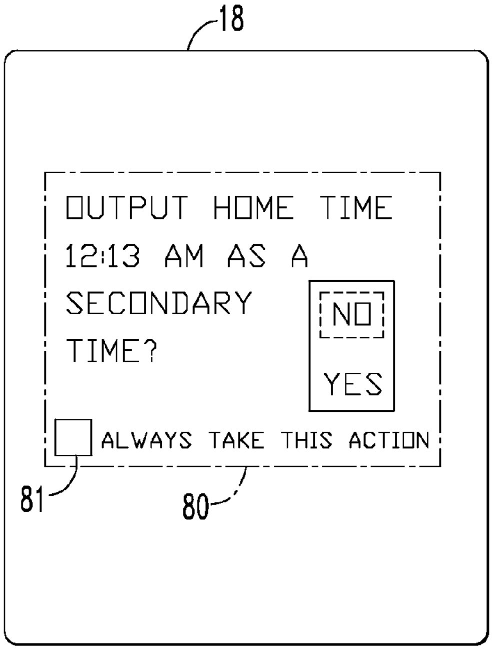
FIG. 5B depicts another exemplary output on the display.

The second dialog 80 of FIG. 5B inquires whether, in view of the fact that the new local time is being used as the current time from FIG. 5A, the home time should be output as a secondary time. Such a secondary time will be output in the form of another visual object on the display 18 that is additional to the visual object that displays the new current time, i.e., the local time. The second dialog 80 also includes a selectable box 81 that is associated with the user option "ALWAYS TAKE THIS ACTION" which, if selected in conjunction with a YES response, will result in the home time being automatically output as a secondary time, i.e., without the outputting of the second dialog 80. If selected in conjunction with a negative response, i.e., a "NO" response, the home time may never be output as a secondary time in such a situation.

Figure 6A:
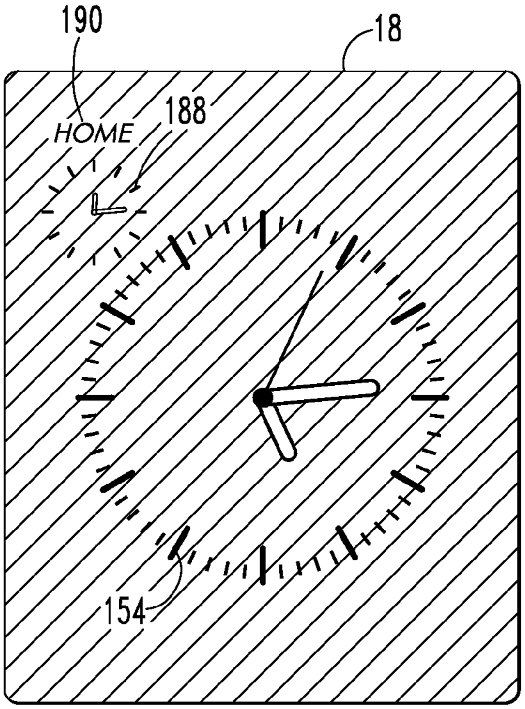
FIG. 6A depicts another exemplary output on the display.

If a negative input is detected in response to the second dialog 80 of FIG. 5B, the time zone management function will cause the dialog of FIGS. 5A and 5B to be terminated and no secondary time will be output. However, if an affirmative input is detected in response to the second dialog 80 of FIG. 5B, the time zone management function will cause the dialog of FIGS. 5A and 5B to be terminated and will also cause the secondary time, which in the current exemplary situation is the home time, to be output on the display 18. An example of such an output is provided in FIG. 6A in the context of the BEDTIME mode, although it will have a similar appearance in the STANDBY mode. It can be seen that FIG. 6A depicts with a first visual object the clock 154 reflecting as the current time the new local time, and this was selected by the user in inputting the affirmative response to the first dialog 76 of FIG. 5A. FIG. 6A additionally depicts with a second visual object a secondary time 188, i.e., the home time in the present example, and this was selected by the user in providing an affirmative response to the second dialog 80 of 5B. The secondary time 188 can optionally include a tag 190 which indicates the origin of the secondary time 188. In the example of FIG. 6A, the tag 190 displays the word "HOME", which indicates that the secondary time 188 is reflective of the home time.

While FIG. 6A depicts an output during operation of the BEDTIME mode, it is expressly noted that another type of visual output will be provided in a corresponding fashion by the GUI routine 46 during operation of the NORMAL mode. In such a circumstance, the secondary time will be added, for instance, to the output of FIG. 1, with the specific positioning and appearance of the secondary time being tailored to fit within the other visual objects within the NORMAL mode home screen, for example. It is reiterated that the display 18 in the STANDBY mode may have an appearance similar to that of FIG. 6A.

Figure 5C:
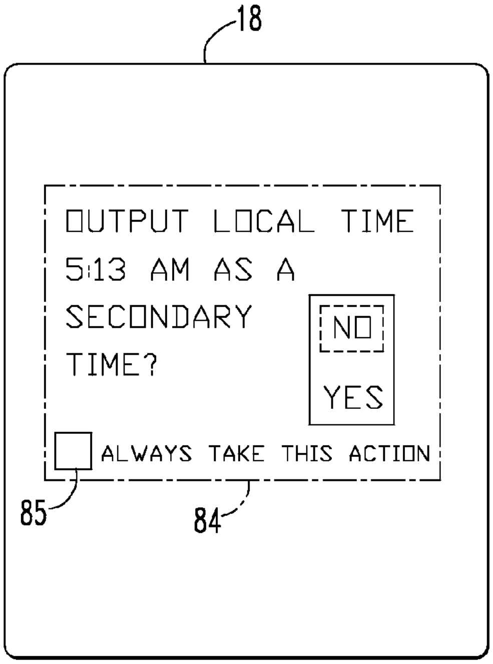
FIG. 5C depicts another exemplary output on the display.

On the other hand, if a negative input was detected in response to the first dialog 76 at FIG. 5A, such as if the NO alternative had been selected from the decision box 77, the time zone management function will output on the display 18 an alternate second dialog 84 such as is depicted generally with a window in FIG. 5C. The alternate second dialog 84 requests an input to indicate whether, in view of the fact that the current time was not set as the local time in FIG. 5A, whether the local time should alternatively be output as a secondary time.

If in response to the alternate second dialog 84 of FIG. 5C the processor apparatus 16 detects a negative input, i.e., a selection of the NO alternative, the time zone management function will terminate the dialog of FIGS. 5A and 5C, and no time will be output as a secondary time on the display. However, if an affirmative input is detected in response to the alternate second dialog 84 of FIG. 5C, such as a selection of the YES alternative, the dialog of FIGS. 5A and 5C will end, and the local time will be output as a secondary time. An example of such an output is depicted in FIG. 6B, again in the exemplary context of the BEDTIME mode. The clock 254 reflects as the current time the home time. Also depicted in FIG. 6B as a secondary time 288 is the local time, with the secondary time 288 being output with the use of a visual object that is additional to the visual object used to output the clock 254. Additionally depicted in FIG. 6B as a part of the secondary time 288 is the optional tag 290 "LOCAL", which indicates to the user that the secondary time 288 is the local time.

Figure 6B:
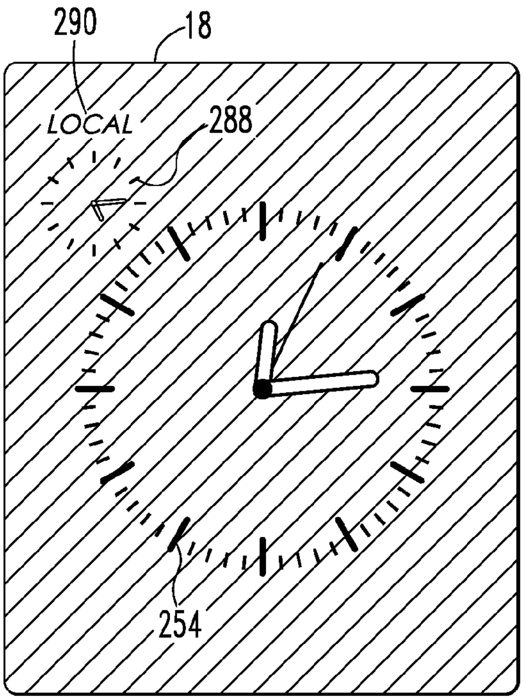
FIG. 6B depicts another exemplary output on the display.

While FIG. 6B depicts an output during operation of the BEDTIME mode, it is expressly noted that another type of visual output will be provided in a corresponding fashion by the GUI routine 46 during operation of the NORMAL mode. In such a circumstance, the secondary time 288 will be added, for instance, to the output of FIG. 1, with the specific positioning and appearance of the secondary time 288 being tailored to fit within the other visual objects within the NORMAL mode home screen, for example. It is noted that the display 18 in the STANDBY mode may have an appearance similar to that of FIG. 6B.

It is noted that the alternate second dialog 84 also includes a selectable box 85 that is associated with the user option "ALWAYS TAKE THIS ACTION" which, if selected in conjunction with a YES response, will result in the local time being automatically output as a secondary time, i.e., without the outputting of the alternate second dialog 84. If selected in conjunction with a negative response, i.e., a selection of the NO alternative, the local time may never be output as a secondary time in such a situation.

In another aspect of the time zone management function, the electronic device 4 may be configured to concurrently output on the display 18 multiple times from multiple time zones, such as in the nature of a "world clock". For instance, a user may conduct business in multiple locations and may occasionally travel between home and some of those locations, and this additional aspect of the time zone management function enables a plurality of different times in different time zones to be output concurrently on the display. Such a "world clock" can be output during operation of the STANBY mode or the BEDTIME mode or both, and potentially can be output at other times as desired.

Figure 6C:
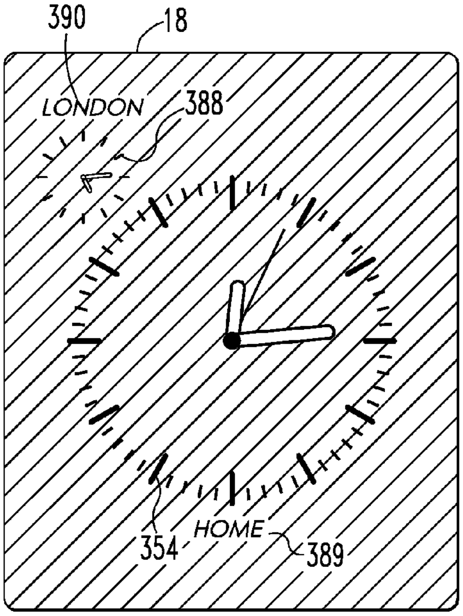
FIG. 6C depicts another exemplary output on the display.

By way of example, and as is depicted generally in FIG. 6C, the user may configure the electronic device 4 to output on the display 18 a "HOME" time, i.e., a current time, with the use of a visual object in the form of a primary clock 354, and to further output a secondary time 388 with the use of another visual object in the form of a smaller secondary clock at another location on the display 18. The primary clock 354 may have displayed therewith a tag 389 such as "HOME". The secondary time 388 may have a tag 390 such as "LONDON" displayed therewith. The "HOME" time output on the primary clock 354 can be readily observed as being the current time, i.e., the local time in the present example, by virtue of its dominant size on the display 18 and its prominent positioning, i.e., its generally centralized positioning, on the display 18.

The electronic device 4 may advantageously be configured to detect a change in time zone and to responsively and automatically alter the multiple times that are output on the display as part of the "world clock". For example, upon detecting that the electronic device 4 has been moved from the time zone where the "HOME" time is prevalent to the time zone applicable to the "LONDON" time, the output on the display 18 will automatically be changed by the GUI routine 46 from that depicted generally in FIG. 6C to that depicted generally in FIG. 6D. Specifically, the primary clock 454 of FIG. 6D can now be seen to reflect as the current time the London time that had been depicted as being the secondary time 388 of FIG. 6C prior to the detected change in time zone. Moreover, a secondary time 488 of FIG. 6D can now be seen to reflect the home time that had been depicted with the primary clock 354 of FIG. 6C prior to the detected change in time zone.

Such a detection of a change in time zone can occur in any of a variety of ways, such as through communications with one or more cellular towers of a cellular network, through reception of GPS transmission, and the like. If the BEDTIME mode is configured such that, for instance, GSM communications are available with the radio, the aforementioned cellular communication can occur to determine location and thus a change in time zone, even when the BEDTIME mode is active. Similarly, if the BEDTIME mode is configured such that, for instance, GPS transmissions are receivable by the radio, the received GPS transmission can be employed to determine location and thus a change in time zone, even when the BEDTIME mode is active.

Figure 6D:
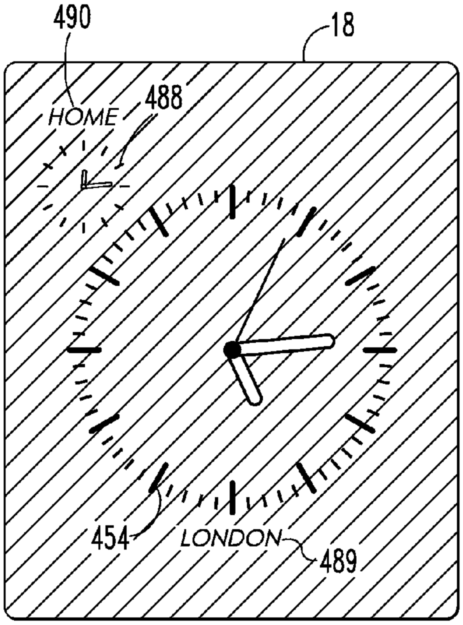
FIG. 6D depicts another exemplary output on the display.

It is noted that for the sake of clarity the "HOME" times depicted in FIGS. 6C and 6D are unchanged, and the "LONDON" times are likewise unchanged. That is, FIGS. 6C and 6D reflect the change in output that will occur upon the instant of detecting a change in time zone and do not reflect, for example, the travel time that is necessary in traveling between the "HOME" time zone and the "LONDON" time zone. The times set forth in FIGS. 6C and 6D are provided in order to most clearly illustrate the change in the "world clock" that may occur automatically upon detecting a change in location from one time zone to another time zone wherein the prevailing times at both times zones are output as part of the "world clock".

The automatic changing of the "world clock" responsive to a detected change in time zone can be an option that is selected as a part of a profile. Also, such automatic changing of the "world clock" can result from having detected a checking of the selectable boxes 78 and 81 that are each associated with the user option "ALWAYS TAKE THIS ACTION", in conjunction with YES responses to the first dialog 76 and the second dialog 80.

The "world clock" can be configured in any of a variety of fashions. For instance, different colors or levels of illumination or brightness or both can be used to distinguish a primary clock from one or more secondary times, i.e., secondary clocks. Also, the individual clocks themselves can be arranged with respect to one another on the display 18 in any of a variety of fashions. It is noted that the outputting of more than one secondary time on the display 18 in addition to a current time reflected on a primary clock can result, for instance, from an express configuration of the "world clock" to have such times from such time zones. Alternative, the may result, for example, with detections of movements of the electronic device 4 among different time zones with a resultant outputting of additional times.

Figure 6E:
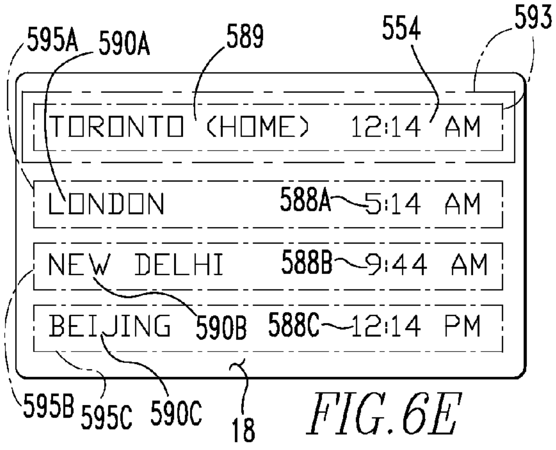
FIG. 6E depicts an exemplary "world clock" that can be output on the display.
Figure 6F:
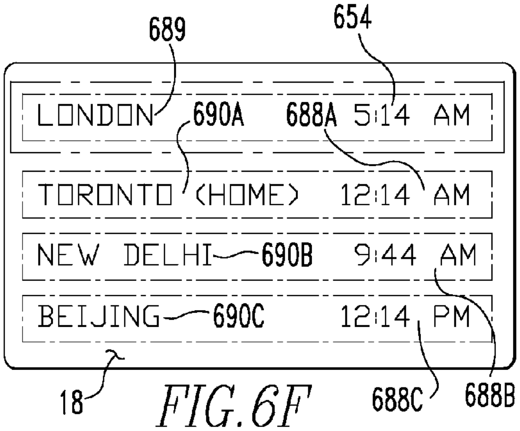
FIG. 6F depicts another exemplary "world clock" that can be output on the display.
Figure 6G:
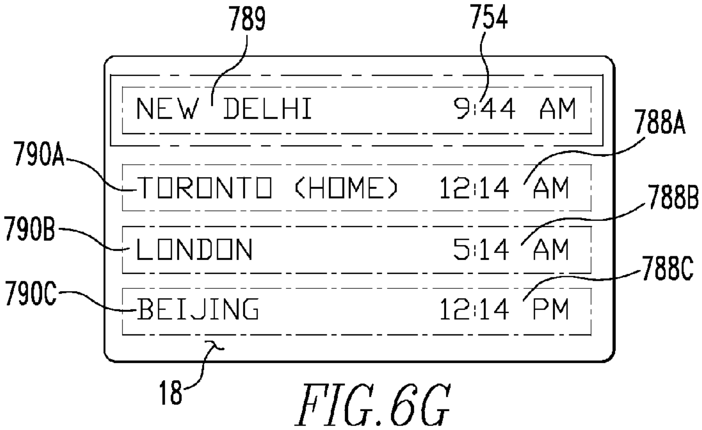
FIG. 6G depicts another exemplary "world clock" that can be output on the display.

One exemplary "world clock" is depicted in the context of the STANDBY mode of operation generally in FIGS. 6E, 6F, and 6G wherein clocks for four different locations are output concurrently on the display 18. It is reiterated that the various times depicted in the clocks of FIGS. 6E, 6F, and 6G reflect the changes in the display 18 that may occur upon the instant of detecting a change in time zone and do not reflect travel times that is required in moving among the respective time zones. It is particularly pointed out that each time is depicted as being the same in FIGS. 6E, 6F, and 6G for purposes of simplicity and clarity of illustrating the concept.

The exemplary "world clock" depicted in FIG. 6E includes a current time depicted by a primary clock 554 that is shown as being disposed above three secondary clocks 588A, 588B, and 588C, i.e., three secondary times. The primary clock 554 is depicted as being the primary clock in FIG. 6E by virtue of the fact that it is situated at the top of a list of four clocks, and because it has a double-outline 593 surrounding it, as opposed to the single outlines 595A, 595B, and 595C surrounding the three secondary clocks 588A, 588B, and 588C. That a given clock on the display 18 is the primary clock and is indicative of a current time on the electronic device 4 can be depicted in any of a variety of ways.

The depiction of the "world clock" in FIG. 6E reflects its presence in, for example, the time zone which contains Toronto, Ontario, Canada. The primary clock 554 includes the tag 589 "TORONTO", whereas the three secondary clocks 588A, 588B, and 588C include the tags 590A "LONDON", 590B "NEW DELHI", and 590C "BEIJING", respectively. The depiction of the "world clock" in FIG. 6F indicates, however, that the electronic device 4 has detected a change in time zone to that which corresponds with London, UK, and has responsively changed the current time to be that of the London time, which is output with the primary clock 654 having the tag 689 "LONDON". The three secondary clocks 688A, 688B, and 688C include the tags 690A "TORONTO", 690B "NEW DELHI", and 690C "BEIJING", respectively.

Similarly, the depiction of the "world clock" in FIG. 6G indicates a detection of a change in time zone of the electronic device 4 to that which corresponds with New Delhi, India. The current time is the automatically changed to be that of the New Delhi time, which is output with the primary clock 754 which bears the tag 789 "NEW DELHI". The three secondary clocks 788A, 788B, and 788C include the tags 790A "TORONTO", 790B "LONDON", and 790C "BEIJING", respectively. It can be seen that the "BEIJING" clock has remained a secondary clock in all of FIGS. 6E, 6F, and 6G and has likewise remained unchanged in its appearance and location. It also can be seen that the "world clock" of FIGS. 6E, 6F, and 6G depicts how the various times can be displayed in relation to one another and how the depiction can change automatically in the event that a change in time zone of the electronic device 4 is detected.

Figures 7, 7A:
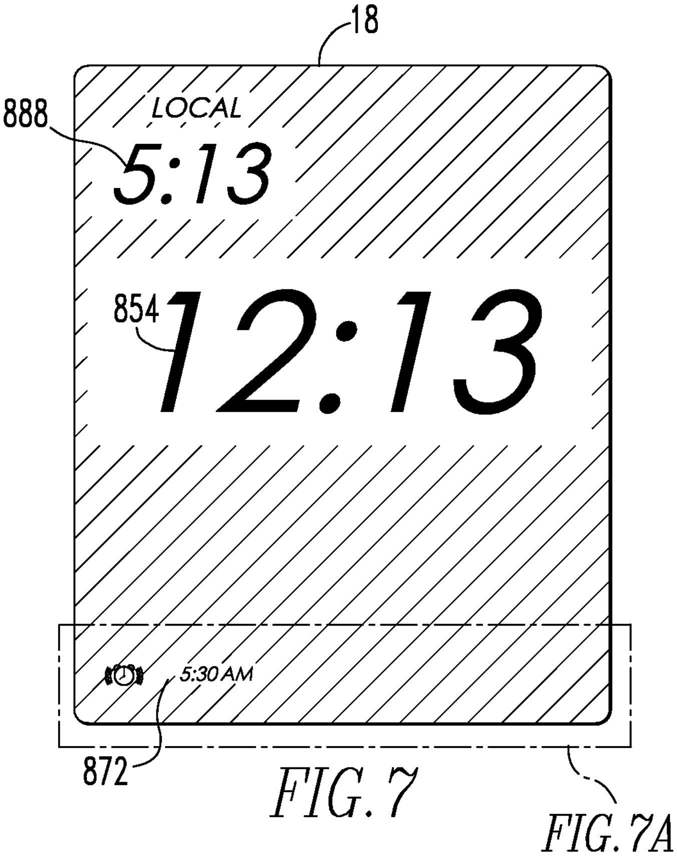
FIG. 7 depicts an exemplary output on the display.
FIG. 7A depicts an enlarged portion of the exemplary output of FIG. 7.
Figure 7A:
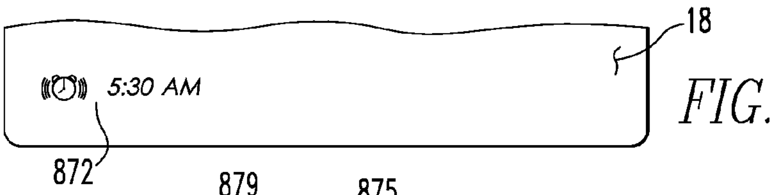

It is noted that a current time, such as is indicated with the analog clocks 54, 154, 254, 354, and 454 may be represented with a representation of an analog clock or a representation of a digital clock without limitation. Also, the secondary times 188, 288, 388, and 488 that are depicted with analog clocks can each be represented with a representation of an analog clock or a representation of a digital clock without limitation. Moreover, the alarm times 72 and 75 that are depicted digitally in FIG. 4 can be output in an analog or a digital form without limitation. FIG. 7 indicates, for example, three visual objects being concurrently output on the display 18, each being in a digital configuration. That is, a current time clock 854, the secondary time 888, and an alarm time 872 are all depicted in digits, i.e., as representations of digital clocks. It is reiterated that any one or more of the clock 854, the secondary time 888, and the alarm time 872 can be depicted in analog or digital form, in any combination. It is also expressly pointed out that the current time, such as is reflected by the clock 854, the secondary time 888, and the alarm time 872 can be output in any combination without limitation. It is reiterated that the times that are output in FIGS. 3, 4, 6A, 6B, 6C, 6D, 6E, 6F, 6G and 7 are all depicted as being output in the context of the BEDTIME mode of operation and that the current time, the secondary times, and the alarm times can be output in the NORMAL mode, such as is added to the home screen depicted generally in FIG. 1.

It is also expressly noted that the alarm clock function as mentioned above may be advantageously executed and provide output in the NORMAL mode, the STANDBY, and the BEDTIME mode in any combination without limitation. The time zone management function may likewise be executed and provide output in the NORMAL mode, the STANDBY, and the BEDTIME mode in any combination without limitation.

The aforementioned alarm clock feature provides an alarm that may be easily set or adjusted or both. FIG. 7A shows a portion of the display 18 of FIG. 7 wherein the alarm time 872 is depicted. Upon detecting a predetermined input, such as detecting an actuation of the track ball 32 in a direction generally toward the housing 6, an interaction component 873 (FIG. 7B) is output on the display 18 in place of the alarm time 872 of FIG. 7A. The interaction component 873 is depicted with the use of a visual object that is larger than the visual object used to output the alarm time 872, i.e., the interaction component 873 is enlarged compared with the alarm time 872. The interaction component 873 also depicts a feature 874 in the form of a representation of an alarm clock that is not depicted as being in a ringing condition, it being noted that the feature 74 of FIG. 4 is in the form of a representation of an alarm clock that is depicted as being in a ringing condition. The interaction component 873 includes a number of fields that each comprise an alterable element of an alarm. In this regard, an "alarm" will include elements such as the time of the alarm, whether the alarm is in an ON condition or in OFF condition, and any particular day or days that the alarm for which the alarm may be set. Other elements will be apparent.

Figure 7B:
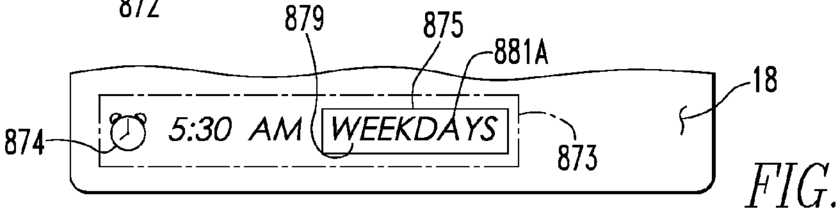
FIG. 7B is a view similar to FIG. 7A, except depicting another exemplary output on the display.

For example, and as is depicted generally in FIG. 7B, the interaction component 873 depicts with a cursor 875 that a focus of the processor apparatus 16 is on a condition field 879. The condition field 879 comprises a number of selectable condition indicators, such as the condition indicator 881A "WEEKDAYS" depicted in FIG. 7B, which indicate a condition of an alarm and which is alterable. For example, when the interaction component 873 is first output on the display 18, as in FIG. 7B, the condition field 879 is highlighted with the cursor 875, and the condition indicator 881A "WEEKDAYS" is output as the default condition indicator in the condition field 879. It is reiterated that the condition indicator 881A "WEEKDAYS" represents an "ON" condition for all weekdays.

Figure 7C:
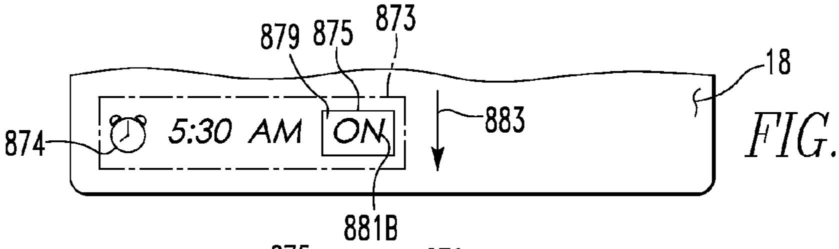
FIG. 7C is a view similar to FIG. 7B, except depicting another exemplary output on the display.

If a navigational input such as a scrolling input from the track ball 32 is detected, such as in a generally vertical (i.e., generally upward or generally downward) direction as is indicated generally at the numeral 883 in FIG. 7C, the condition indicator 881A "WEEKDAYS" is replaced with another condition indicator 881B "ON" in the condition field 879. If another such scrolling input in the same downward direction 883 is detected, such as from the track ball 32, still another condition indicator 881C "OFF" is depicted in the condition field 879 in place of the condition indicator 881B "ON", as is depicted generally in FIG. 7D.

Figure 7D:
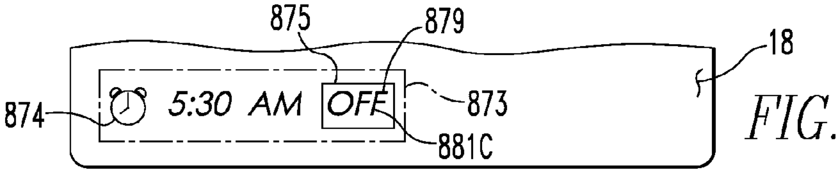
FIG. 7D is a view similar to FIG. 7C, except depicting another exemplary output on the display.

In any of FIGS. 7B, 7C, and 7D, a selection input with respect to the condition indicator 881A, 881B, or 881C, respectively, will result in a selection of the condition indicator 881A, 881B, or 881C, respectively, that is depicted in the condition field 879 at the time of the selection input. Whichever of the condition indicators 881A "WEEKDAYS", 881B "ON", or 881C "OFF" is the subject of such a selection input will be the condition applied to the alarm, i.e., a selection input with respect to the condition indicator 881A "WEEKDAYS" will cause the alarm to be in an "ON" condition for all weekdays, i.e., Monday through Friday, inclusive. Alternatively, a selection input with respect to the condition indicator 881B "ON" will set the alarm to an "ON" condition for the next occurrence only of the alarm time. A selection with respect to the condition indicator 881C "OFF" will set the alarm to an "OFF" condition. In this regard, the order in which the various condition indicators 881A, 881B, and 881C are provided in response to the scrolling inputs can be varied as appropriate. In the exemplary embodiment depicted herein, the condition indicators 881A, 881B, and 881C are arranged in the order most likely to be desired for an alarm.

A selection input, such as with respect to any of the condition indicators 881A, 881B, and 881C in the condition field 879, can occur as a result of a detection of a translation of the track ball 32 in a direction generally toward the housing 6. Advantageously, however, a detection of a navigational input to another field within the interaction component 873 will be detected by the processor apparatus 16 as comprising an implicit selection input of whichever of the condition indicators 881A, 881B, or 881C was active in the condition field 879 at the time of the navigational input. For instance, if from FIG. 7C a navigational input from the track ball 32 in a leftward direction, such as is indicated generally at the numeral 885 in FIG. 7E, is detected as comprising a selection of the condition indicator 881B "ON", as well as will result in a shifting of the focus of the processor apparatus 16 to an AM/PM field 887 of the interaction component 873.

Figure 7E:
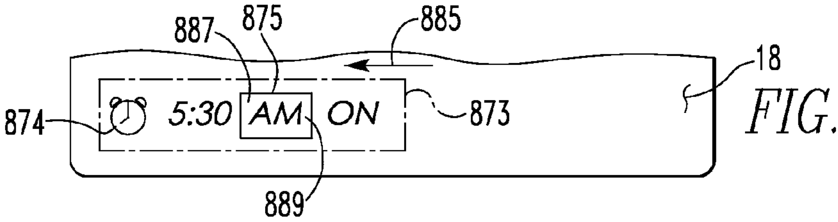
FIG. 7E is a view similar to FIG. 7C, except depicting another exemplary output on the display.

In FIG. 7E, the AM/PM field 887 has depicted therein an AM indicator 889, with the AM indicator 889 being an alterable element of the alarm. For instance, a navigational input, such as from the track ball 32, in the downward direction 883 will cause the AM indicator 889 to be replaced in the AM/PM field 887 with, for example, another indicator such as a PM indicator. However, if from FIG. 7E another navigation input is detected from the track ball 32 in the leftward direction 885, the navigational input will be detected as comprising an implicit selection input with respect to the AM indicator 889 and will cause a minutes field 891 of the interaction component 873 to be highlighted with the cursor 875, as is indicated generally at FIG. 7F.

Figure 7F:
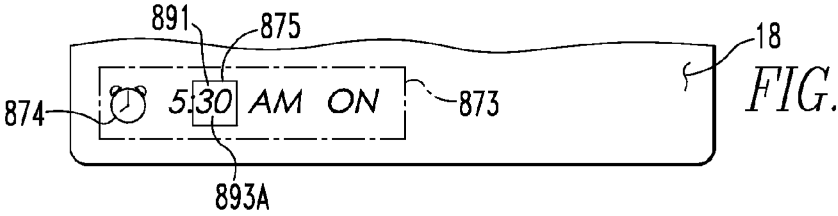
FIG. 7F is a view similar to FIG. 7E, except depicting another exemplary output on the display.
Figure 7G:
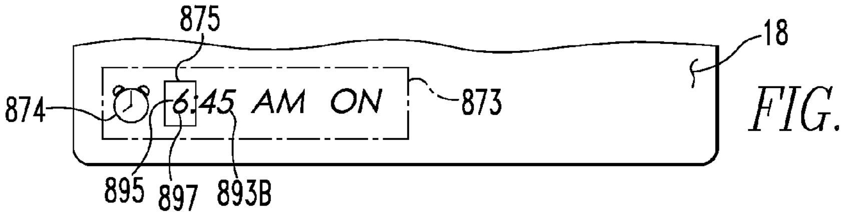
FIG. 7G is a view similar to FIG. 7F, except depicting another exemplary output on the display.

The minutes field 891 of FIG. 7F has a minutes indicator 893 "30" depicted therein. In such a condition, the focus of the processor apparatus 16 is on the minutes field 891. The current setting within the minutes field 891 is "30", with "30" being an alterable element of the alarm. For instance, a navigational input, such as from the track ball 32, in the downward direction 883 or in an opposite direction (not expressly depicted herein) will result in an alteration of the contents of the minutes field 891, i.e., an alteration of an alterable element of the alarm. By way of example, a navigational input, such as a scrolling input from the track ball 32 in the downward direction 883, may result in the outputting of a different minutes indicator 893B "45" such as depicted generally in FIG. 7G. FIG. 7G further depicts the cursor 875 as highlighting an hour field 895 of the interaction component 873. Between FIGS. 7F and 7G, therefore, the processor apparatus 16 may have detected the aforementioned scrolling input from the track ball 32 in the downward direction 883 to cause an outputting of the minutes indicator 893B "45" when the cursor 875 was highlighting the minutes field 891, i.e., when the focus of the processor apparatus 16 was on the minutes field 891. This detected input may have been followed by a detected navigational input from the track ball 32 in the leftward direction 885 to implicitly provide a selection input as to the minutes indicator 893B "45" and shift the focus of the processor apparatus 16 to be on the hour field 895. FIG. 7G further depicts in the hour field 895 an hour indicator 897 "6" which indicates that between FIGS. 7H and 7G a further scrolling input from the track ball 32 in, for instance, the downward direction 883 was detected when the focus of the processor apparatus 16 was on the hour field 895. That is, FIG. 7F depicts in the hour field 895 the digit "5", whereas in FIG. 7G the hour field 895 is the subject of the focus of the processor apparatus, and the hour indicator 897 indicates "6".

Figure 7H:
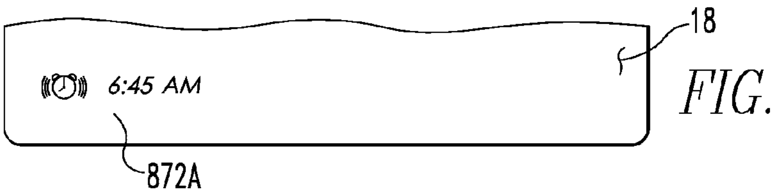
FIG. 7H is a view similar to FIG. 7G, except depicting another exemplary output on the display.

If from FIG. 7G another selection input is detected from the track ball 32, such as from a translation of the track ball 32 toward the housing 6, the alterable elements in their current conditions are applied to the alarm, and the interaction component 873 is replaced on the display 18 with an updated alarm time 872A, such as is depicted generally in FIG. 7H. The updated alarm time 872A is depicted as being of the same size on the display 18 as the alarm time 872, both of which are smaller than interaction component 873. The interaction component 873, when output on the display 18 is larger than the alarm time 872 or the updated alarm time 872A or both in order to enable the user to more readily view the alterable elements of the alarm time that is being set via the interaction component 873. Once the alterable elements of the alarm have been altered as appropriate, the updated alarm time 872A is output on the display 18 in its relatively smaller form.

It is noted that an alternate type of input can be detected when the interaction component 873 is output on the display 18 in order to alter an alterable element of the alarm. Specifically, a numeric input detected while the interaction component 873 is output on the display 18 will result in the numeric values of the numeric input being used as an alarm time. In the embodiment depicted herein, it is noted that such a numeric input is employed as an alarm time when the numeric input is detected in conjunction with either an implicit or an explicit termination. For example, a numeric input "645" followed by a termination input "a" will cause the alarm time to be set at 6:45 AM. In such a situation, a selection input detected from the track ball 32 will result in a finalization of the alarm settings and will result in the output depicted generally at FIG. 7H. A numeric input of "0645" will provide the same result, it being noted that the fourth numeric input will be detected as an implicit termination. A numeric input of "1845" will result in a setting of the alarm at 6:45 PM. Moreover, a detection of the numeric input "645" followed by a selection input from the track ball 32 will result in the output depicted generally FIG. 7H, with the selection input from the track ball 32 being detected as an explicit termination. It is noted that the "A" key 28 and the "P" key 28 do not have a digit assigned thereto. As such, the numeric input of "645" followed by an "a" does not require the user to switch between, say, a numeral mode and an alphabetic mode inasmuch as the "A" and "P" keys 28 are non-numeric. As such, a numeric clock setting mode for the clock can be a hybrid numeral and alphabetic mode, i.e., it will detect actuations of keys 28 having a digit assigned thereto as numeric inputs, and it will detect an actuation of a non-numeric key 28, such as the key 28 having "A" or "P" assigned thereto, as an alphabetic input.

The improved alarm clock feature thus provides an alarm that is easy to set, and notably is capable of being set solely though inputs provided by the track ball 32. If a numeric input of the alarm time is provided, this employs a number of the keys 28 in addition to the track ball 32, but the numeric mode of entry adds flexibility and thus advantageously provides an easy way to input an alarm time.

The same type of alarm can also be set from a calendar feature, which provides added flexibility. The calendar feature can be initiated by, for example, selecting the icon 1062B depicted on the home screen of FIG. 16. Among other functions, the calendar feature enables the scheduling of meetings, the setting of reminders, and the setting of alarms. The notifications that are provided by the calendar feature with respect to meeting and reminder entries are typically in the nature of visual notifications on the display 18 and audio notifications of a limited duration, for example. That is, the notifications that typically are provided with respect to scheduled meetings and reminders are not intended to awaken a person, but rather to get a person's attention during waking hours, for instance. On the other hand, an alarm that is set via the calendar feature will result in a notification that is typical of the alarm clock feature, i.e., it includes an audio notification that is persistent and that shuts off only upon a detection of a predetermined input, such as an actuation of a key 28 or other input. It likewise can be edited in the fashion set forth above, and the time of the alarm is output on the display 18 as a next alarm time, such as is depicted at the numeral 72 in FIG. 4, for instance. By employing the calendar function to set an alarm, the alarm can be set days in advance, and multiple such alarms can be set. Also, the setting of an alarm from a calendar enables the setting of an alarm for a single day, multiple specific days, or for every day, for example.

Figure 8:
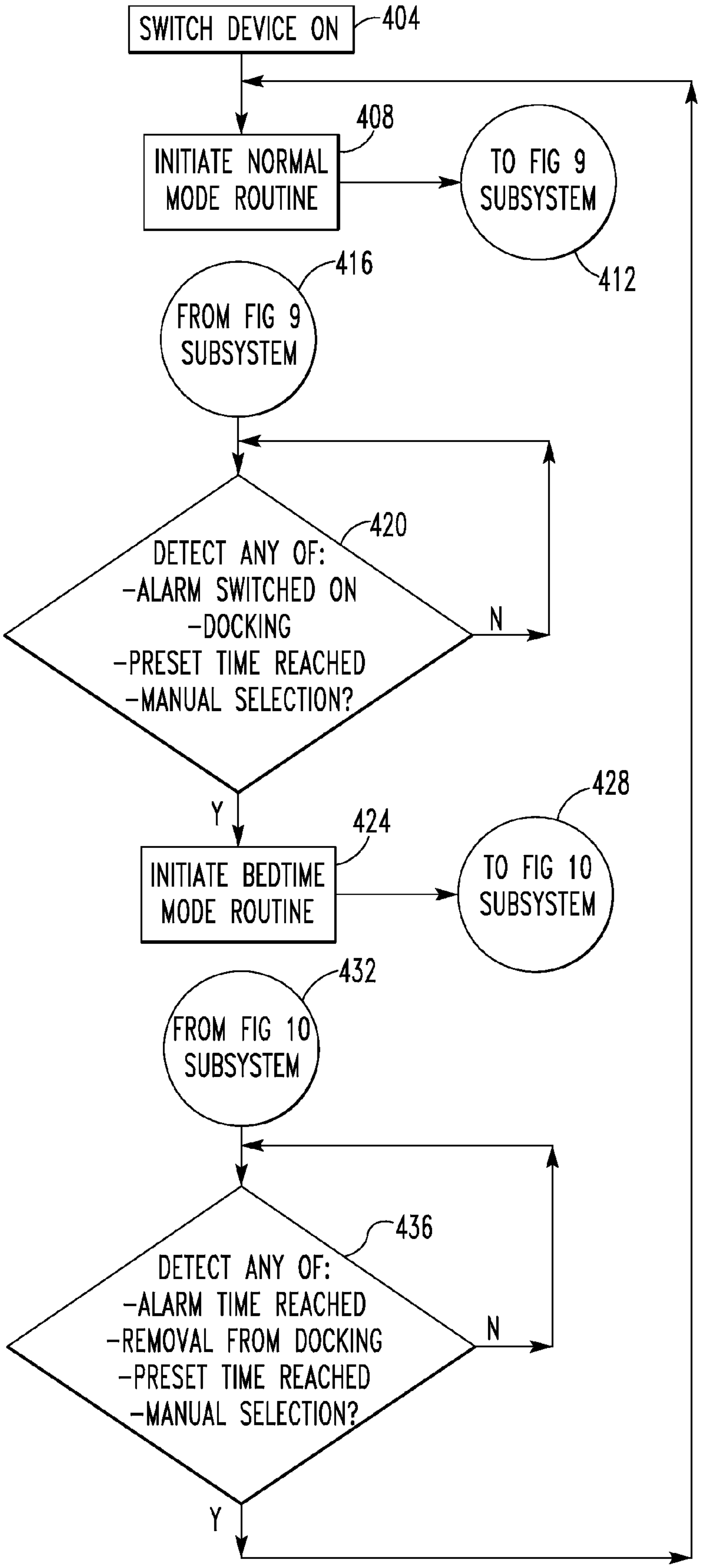
FIG. 8 depicts an exemplary flowchart of a portion of an improved method in accordance with the disclosed concept.

A flowchart in FIG. 8 depicts in general terms the overall flow of a portion of the improved method implemented in the electronic device 4 in accordance with various embodiments of the present disclosure. For instance, the electronic device 4 is initially switched on, as at 404. Since the NORMAL mode of operation is the default operational mode, processing is immediately transferred to 408 where the NORMAL mode routine 49 is initiated. Processing is thereafter transferred, as at 412, to the subsystem in FIG. 9.

Figure 9:
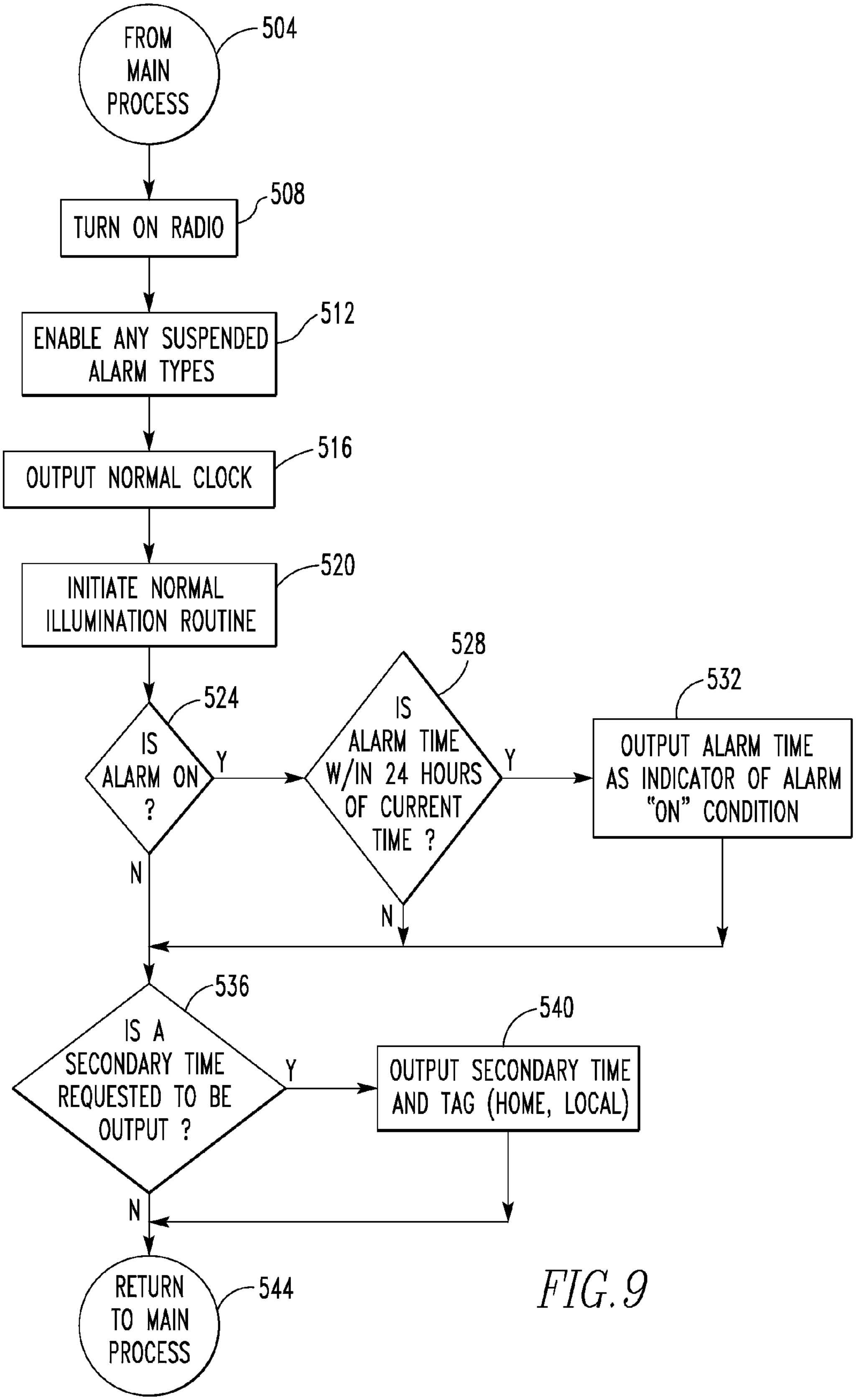
FIG. 9 is another exemplary flowchart of a portion of the improved method.

In FIG. 9, processing begins, as at 504, from the main process. Execution of the NORMAL mode routine 49 may cause the RF apparatus 11 to be turned to an ON condition, as at 508. The NORMAL mode routine 49 also may cause, as at 512, the enabling of all alarm types, which will include the enablement of any suspended alarm types. The NORMAL mode routine 49 also may cause the outputting of the clock 54 on the display 18, as at 516. Execution of the NORMAL mode routine 49 also may cause, as at 520, an initiation of the NORMAL illumination routine, as will be discussed in greater detail below. It is understood that the aforementioned actions are not all necessarily required to initiate the NORMAL mode.

Processing thereafter continues, as at 524, where it is determined whether the alarm clock function is in an ON condition, which will include the WEEKDAYS condition. If yes, processing thereafter continues, as at 528, where it is determined whether the alarm time is within a predetermined period of time of the current time. In the example presented herein the predetermined period of time is twenty-four hours. In the WEEKDAYS condition it is also ascertained whether the alarm time will occur on a weekday. If it is determined, as at 528, that the alarm time is within the predetermined period of time of the current time (and is on a weekday in the WEEKDAYS condition), processing continues, as at 532, where the alarm time is output on the display 18 as an indicator that the alarm clock function is in an ON condition and by doing so also outputs the alarm time. It is noted that for purposes of simplicity such an outputting of the alarm time is not expressly depicted on the display 18 of FIG. 1. Processing thereafter continues to 536, as it will if a negative result occurs at 524 or at 528.

At 536 it is determined whether a secondary time has been requested to be output. This will occur, for instance, if the response to the second dialog 80 of FIG. 5B or the response to the alternate second dialog 84 of FIG. 5C was in the affirmative, i.e., requesting that the home time or the local time, respectively, be output as a secondary time on the display 18. If it is determined, as at 536, that a secondary time is to be output, processing continues, as at 540, where the secondary time is output on the display 18 as a visual object additional to the clock 54 which was output at 516. Also at 540, an optional tag can be output in support of the secondary time, although this is purely optional in nature. It is again noted that for purposes of clarity such an outputting of the secondary time and the optional tag are not expressly depicted on the display 18 of FIG. 1. Processing thereafter continues, as at 544, to the main process at 416 in FIG. 8, as will likewise occur if a negative result occurs at 536.

When the NORMAL mode of operation is active on the electronic device 4, the processor apparatus 16 regularly checks, as at 420, to determine whether it has detected any predetermined event that will trigger execution of the BEDTIME mode routine 51. For example, and as at 420, the processor apparatus 16 determines whether any of the exemplary triggering events is detected. Such triggering events comprise the alarm clock function being switched to an ON condition, which will include the WEEKDAYS condition when the alarm time falls on a weekday. It is reiterated that such a triggering event may cause a delayed execution of the BEDTIME mode routine 51, as mentioned above. The exemplary triggering events further comprise the electronic device 4 being docked or otherwise connected with another device in a fashion that will trigger execution of the BEDTIME mode routine 51. Another exemplary triggering event for execution of the BEDTIME mode routine 51 comprises the reaching of a preset time for triggering the execution of the BEDTIME mode routine 51. Another exemplary triggering event for execution of the BEDTIME mode routine 51 comprises a manual selection input that manually executes the BEDTIME mode routine 51. It is reiterated that all of these triggering events are exemplary in nature and can be employed in any combination, and it is noted that other triggering events can be employed without departing from the present concept.

If at 420 no such triggering event is detected, processing loops back to 420, thereby enabling periodic determinations of whether any such triggering event has occurred. Once it is determined, as at 420, that a predetermined triggering event that will trigger execution of the BEDTIME mode routine 51 has occurred, processing continues, as at 424, where the BEDTIME mode routine 51 is initiated. Processing is then transferred, as at 428, to the subsystem depicted generally in FIG. 10.

Figure 10:
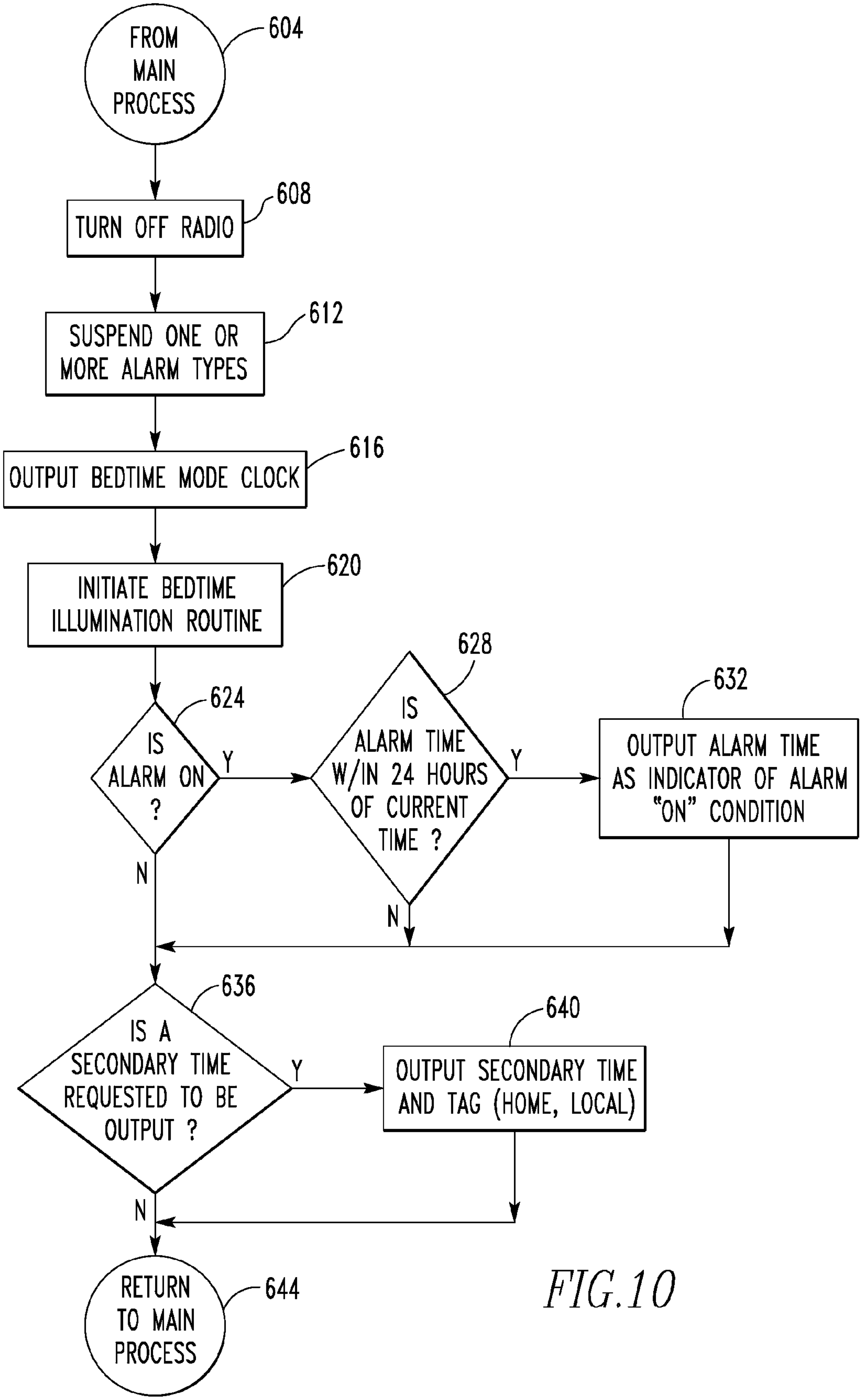
FIG. 10 is another exemplary flowchart of a portion of the improved method.

In FIG. 10, processing continues, as at 604, from the main process of FIG. 8. Execution of the BEDTIME mode routine 51 may cause the RF apparatus 11 to be turned off in whole or in part, as at 608. The BEDTIME mode routine 51 also may suspend, as at 612, one or more types of alarms or all alarms that otherwise is output in response to an occurrence of a predetermined event subsequent to execution of the BEDTIME mode routine 51, i.e., subsequent to activating of the BEDTIME mode. The BEDTIME mode routine 51 also may output a clock, such as the clock 58, on the display 18, as at 616. In the exemplary embodiment depicted herein, it is reiterated that the clock 58 of the BEDTIME mode is larger and is disposed in a different location that the clock 54 of the NORMAL mode. The BEDTIME mode routine 51 also may initiate the BEDTIME illumination routine, as at 620, and as will be described in greater detail below. It is reiterated that the features of the BEDTIME mode routine 51 as indicated at the numerals 608, 612, 616, and 620 are not necessarily all required, and fewer than all of the elements in any combination can comprise the BEDTIME mode without departing from the present concept.

Processing thereafter continues, as at 624, where it is determined whether or not the alarm is in an ON condition, as may result from either the ON or the WEEKDAYS conditions. If yes, it is then determined, as at 628, whether the alarm time is within a predetermined period of time of the current time, with the exemplary predetermined period of time herein being twenty-four hours. In the WEEKDAYS condition it is also ascertained whether the alarm time will occur on a weekday. If an affirmative result is achieved at 628, processing continues, as at 632, where the alarm time is output on the display 18 with the use of a visual object, as is shown at the numeral 72 in FIG. 4. It is reiterated that the alarm time 72 is an indicator that the alarm is in an ON condition and displays the alarm time. Processing thereafter continues, as at 636, as it will if a negative result occurs at 624 or at 628.

At 636 it is determined whether a secondary time has been requested to be output. If so, processing continues, as at 640, where the secondary time is output, along with the optional tag, if desired, such as is shown in FIGS. 6A and 6B. Processing thereafter continues to 644, as it will if a negative result occurs at 636. Processing continues from 644 to the main process at 432 in FIG. 8.

From 432 in the main process, processing continues, as at 436, where the processor apparatus 16 periodically determines whether any predetermined events have occurred that will trigger an execution of the NORMAL mode routine 49 to activate the NORMAL mode on the electronic device 4. For instance, execution of the NORMAL mode routine 49 may be triggered upon an alarm time of the alarm clock function being reached. Another predetermined event that may trigger an execution of the NORMAL mode routine 49 is a removal of the electronic device 4 from another device to which it was connected, such as a predetermined docking station. The NORMAL mode routine 49 also may be triggered by an occurrence of a preset time being reached. The NORMAL mode routine 49 also may be triggered by a manual selection of an object such as an icon to manually trigger execution of the NORMAL mode routine 49.

If at 436 no predetermined triggering event is identified, processing loops back to 436, thereby enabling the processor apparatus 16 to periodically and repeatedly seek to determine whether such a triggering event has occurred. Again, it is noted that the aforementioned predetermined triggering events are exemplary in nature only and fewer than all may be provided in any combination, and other predetermined triggering events can be employed without departing from the present concept. If at 436, however, such a triggering predetermined event has been determined to have occurred, processing continues, as at 408, where the NORMAL mode routine 49 is initiated.

With regard to the triggering of the NORMAL mode routine 49 by an alarm time of the alarm clock function being reached, it is reiterated that during operation of the BEDTIME mode some, if not all, visual, audio, and tactile alarms are suspended. As such, the reaching of the set alarm time may not result in an alarm being output if the BEDTIME mode remains active. The reaching of the set alarm time therefore is one of the predetermined events which, upon occurrence, results in the execution of the NORMAL mode routine 49 which thereby effectively causes a termination of the BEDTIME mode of operation. Upon executing the NORMAL mode routine 49, the alarm types that have been suspended are, as at 512, enabled. As such, it can be seen that when the alarm clock function is in an ON condition, and when the alarm time is reached while the BEDTIME mode is in operation, the reaching of the alarm time triggers a termination of the BEDTIME mode and an actuation of the NORMAL mode. This enables the alarm of the alarm clock function to be output to the user. It is reiterated that the setting of the alarm clock function to an ON condition may have been the predetermined event which triggered, as at 420, a switching of the electronic device 4 from the NORMAL mode to the BEDTIME mode by causing an initiation, as at 424, of an execution of the BEDTIME mode routine 51.

It is also noted that the BEDTIME mode may be configured such that an alarm of the alarm clock function is not suspended. In such a situation, the reaching of the alarm time will result in an outputting the alarm in the usual fashion without necessarily triggering an execution of the NORMAL mode routine 49.

Figure 11:
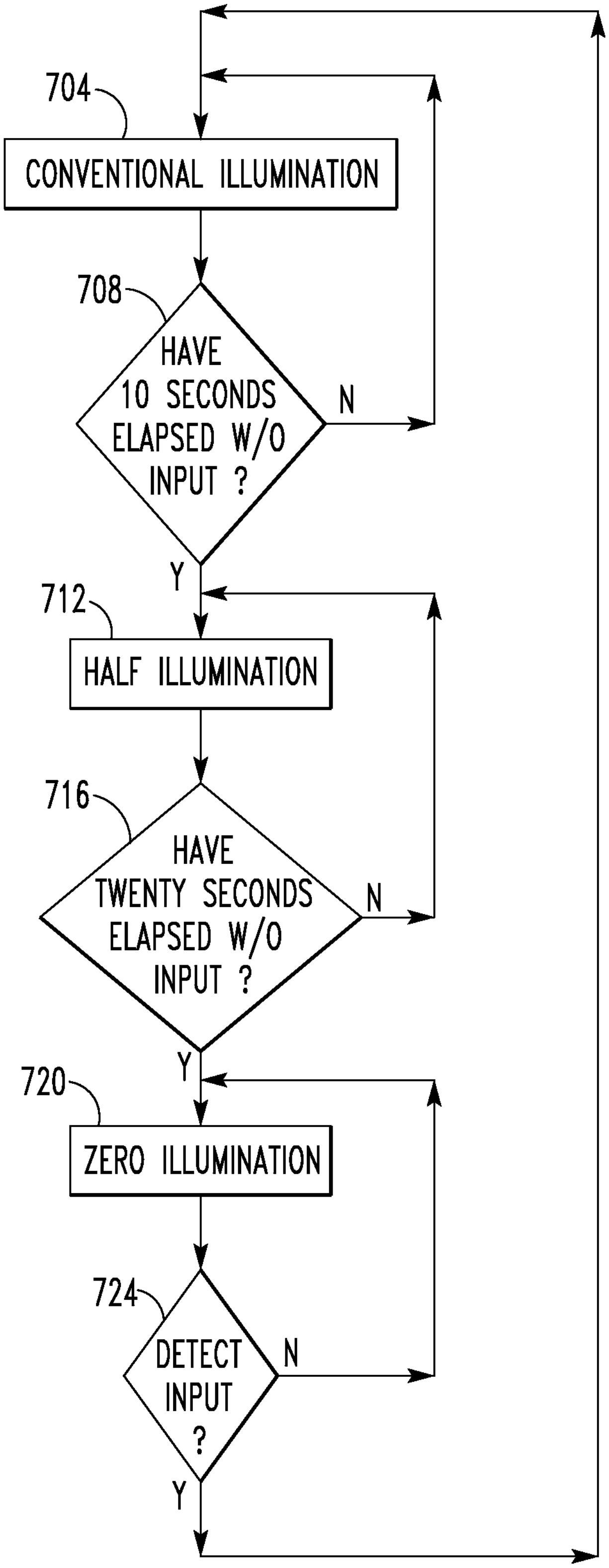
FIG. 11 is another exemplary flowchart of a portion of the improved method.

The NORMAL illumination routine mentioned at the numeral 520 in FIG. 9 is depicted in greater detail in FIG. 11. Upon initial execution of the NORMAL illumination mode, conventional illumination is applied, as at 704, to the display 18 or to the keypad 24 or to the track ball 32 or any combination thereof. More specifically, the level of illumination gradually increases from an initial level of illumination to the conventional level of illumination. Such a gradual increase in illumination level results in a ramped increase in brightness of the display, which may be desirable since it affords the eye an opportunity to adjust to the change in brightness.

Processing thereafter continues, as at 708, where it is determined whether an exemplary period of time, such as ten seconds, has elapsed without an input. In this regard, an input is in the nature of an input from the input apparatus 8. If not, processing continues, as at 704, where conventional illumination is maintained until it is determined, as at 708, that the predetermined period of time has elapsed without an input. Processing thereafter continues, as at 712, where illumination is reduced to a lower illumination level, e.g., approximately one-half of conventional illumination in the present example. Processing thereafter continues, as at 716, where it is determined whether another predetermined period of time, e.g., twenty seconds, has elapsed without a detection of an input. In the present example, the exemplary twenty seconds sought at the numeral 716 is in addition to the ten seconds identified at 708. If at 716 the predetermined period of time has not elapsed without detection of an input, processing continues, as at 712, until it is determined, as at 716, that the period of time has elapsed without an input. Processing thereafter continues, as at 720, where substantially zero illumination is applied. It is then determined, as at 724, whether a further input is detected. If not, processing continues, as at 720 and at 724, with substantially zero illumination until an input is detected, as at 724, after which processing will continue, as at 704, where conventional illumination will be achieved.

It is noted that the NORMAL illumination routine of FIG. 11 is exemplary only and indicates a method by which conventional illumination of the display 18 or the keypad 24 or the track ball 32 or any combination thereof can be gradually reduced to a level of substantially zero illumination in the absence of a detection of an input for a predetermined period of time. It is noted that if inputs are detected at 716, processing can be returned to 704 to provide conventional illumination without departing from the present concept. It is noted, however, that conventional illumination, as at 704, and approximately half illumination, as at 712, are each at a level of brightness which, if applied during operation of the BEDTIME mode, will constitute a distraction to a user an will interfere with sleep. As such, the BEDTIME mode routine 51, when executed, initiates at 620 its own BEDTIME illumination routine, which is depicted in greater detail in FIG. 12.

Figure 12:
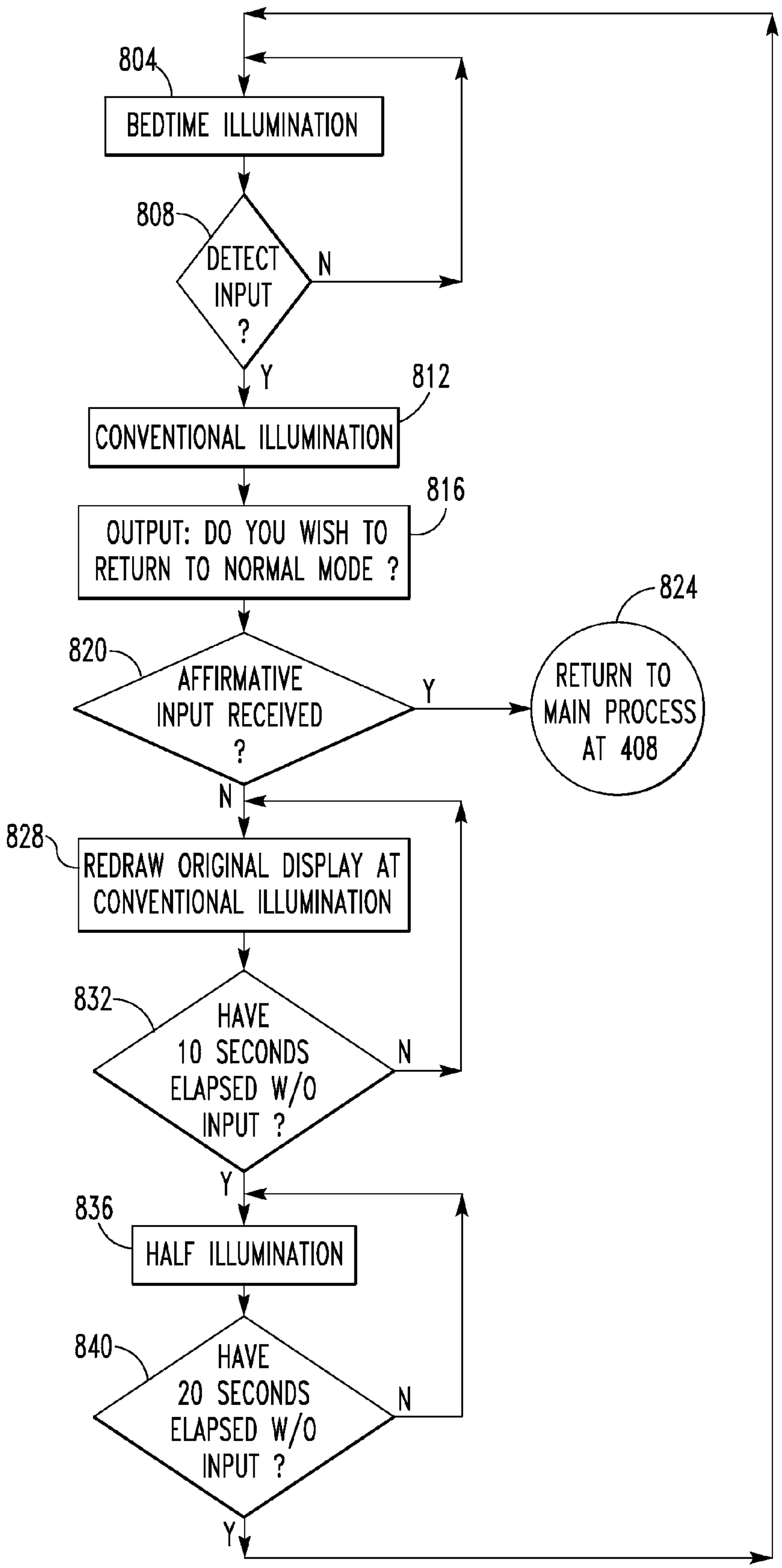
FIG. 12 is another exemplary flowchart of a portion of the improved method.

Processing of the BEDTIME illumination routine begins, as at 804 in FIG. 12, with BEDTIME illumination of the display 18 or the keypad 24 or both. In this regard, it is reiterated that BEDTIME illumination is at a level of illumination typically no more than about a few percent of the conventional illumination provided at the numeral 704 of FIG. 11. Processing continues, as at 808, where it is determined whether an input has been detected, such as an input from the input apparatus 8. If no input is detected, processing loops back to 804 where the BEDTIME level of illumination is maintained until an input is detected, as at 808, after which processing continues, as at 812, where conventional illumination is provided. More specifically, the level of illumination gradually increases from the BEDTIME level of illumination to the conventional level of illumination. Such a gradual increase in illumination level results in a ramped increase in brightness of the display, which may be desirable since it affords the eye an opportunity to adjust to the change in brightness.

It is noted that whenever a triggering predetermined event, such as one which will automatically result in execution of the NORMAL mode routine 49, is detected at 436 in FIG. 8, the initiation of the NORMAL mode routine 49 automatically removes processing from the flowchart of FIG. 12 in favor of processing beginning at the numeral 408 in FIG. 8. The same can be said of the way in which execution of the BEDTIME mode routine 51 automatically removes processing from the flowchart of FIG. 11 in favor of processing beginning at the numeral 420 in FIG. 8.

Returning to FIG. 12, if a detected input has resulted in conventional illumination at 812, a dialog can be initiated, as at 816, where a query is output on the display 18 requesting an input as to whether an immediate return to the NORMAL mode of operation is desired. It will then be determined, as at 820, whether an affirmative input was received in response to the query at the numeral 816. If an affirmative input is received, as at 820, processing continues, as at 824, where processing will return to the main process at the numeral 408 in FIG. 8, which will result in initiation of the NORMAL mode routine 49. However, if an affirmative input is not received at 820, i.e. if a negative input is received, processing continues, as at 828, where the display is redrawn at conventional illumination, and processing continually loops between 832 and 828 until it is determined, as at 832, that a predetermined period of time has elapsed, ten seconds in the present example, without a detection of an input.

Once it is determined, as at 832, that no input has been detected within the predetermined period of time, processing continues, as at 836, where illumination of the display 18 or the keypad 24 or the track ball 32 or any combination thereof is reduced to a lower level of illumination, e.g., an exemplary one-half of the conventional illumination of 812. Again, a loop is created between 836 and 840 whereby the exemplary one-half illumination is maintained until a predetermined period of time, an additional twenty seconds in the example presented herein, is determined to have elapsed without a detection of an input. Once the exemplary twenty seconds have elapsed without a detection of an input, processing returns to 804 where BEDTIME illumination is applied to the display 18, the keypad 24, or the track ball 32, or any combination thereof and is maintained until, for instance, an input is detected at 808. It is noted that the periods of time set forth herein for the BEDTIME illumination routine and the NORMAL illumination routine are exemplary only and may be different than those set forth herein. It is also noted that the periods of time employed with the BEDTIME illumination routine may be different than those employed with the NORMAL illumination routine.

It is noted that the BEDTIME illumination routine of FIG. 12 generally maintains the low non-zero level of illumination at 804 during the duration of the BEDTIME mode unless some type of an input is detected. In the absence of such an input, BEDTIME illumination is maintained until the NORMAL mode is initiated. This is different than the NORMAL mode of operation wherein illumination of the display 18, the keypad 24, the track ball 32, or any combination thereof is rapidly dropped from a conventional level of illumination to a substantially zero level of illumination if no input is received within a relatively short period of time. It is also noted that the BEDTIME illumination routine, when executed, starts from an illumination level set by the NORMAL illumination routine at a substantially zero illumination level, as at 720, or a non-zero relatively bright illumination level at 704 or 712. Execution of the BEDTIME illumination routine causes the illumination to be changed from such a substantially zero illumination level or a non-zero illumination level to a relatively dim BEDTIME illumination level, at 804, which is maintained until, for instance, an input is detected. The subtle lighting of the display 18 or the keypad 24 or the track ball 32 or any combination thereof provided by the BEDTIME illumination at 804 advantageously makes the electronic device 4, and the contents of the display 18 or the keypad 24 or both, discernable by the user when necessary but is of an intensity that is sufficiently low to not constitute a distraction.

Figure 13A:
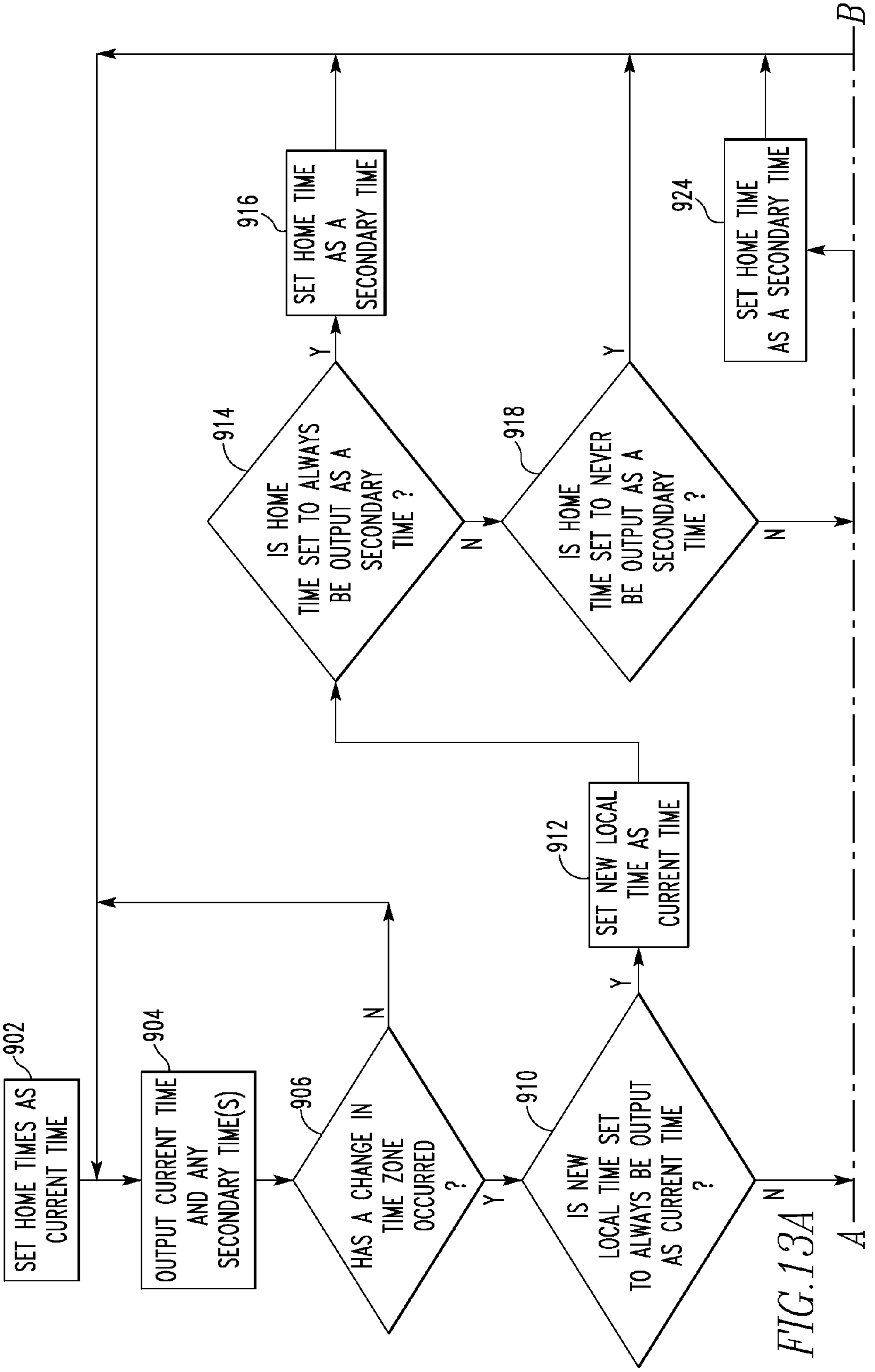
FIG. 13 is another exemplary flowchart of a portion of the improved method, and it extends across three pages indicated as 13A, 13B, and 13C.
Figure 13B:
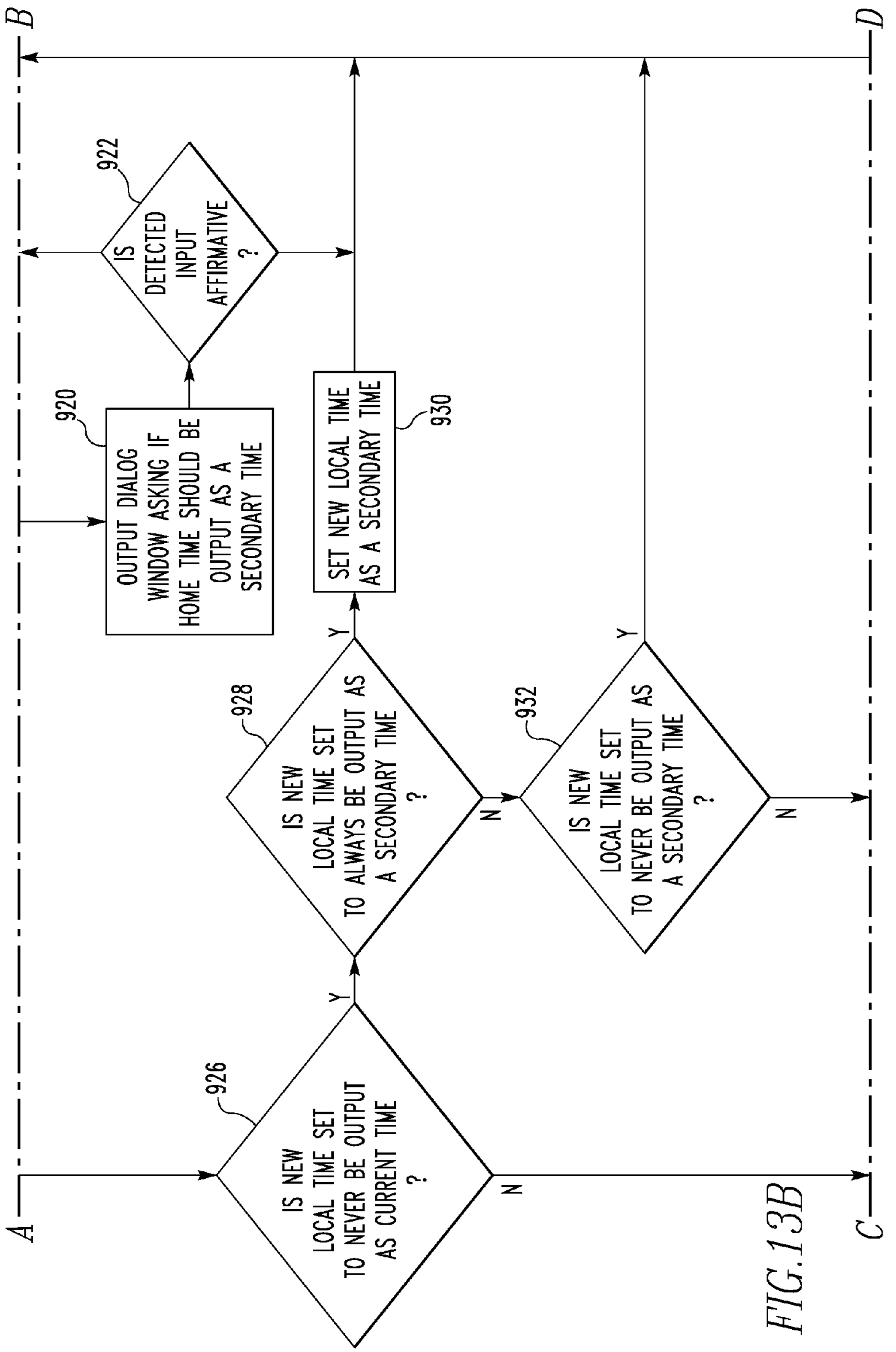
Figure 13C:
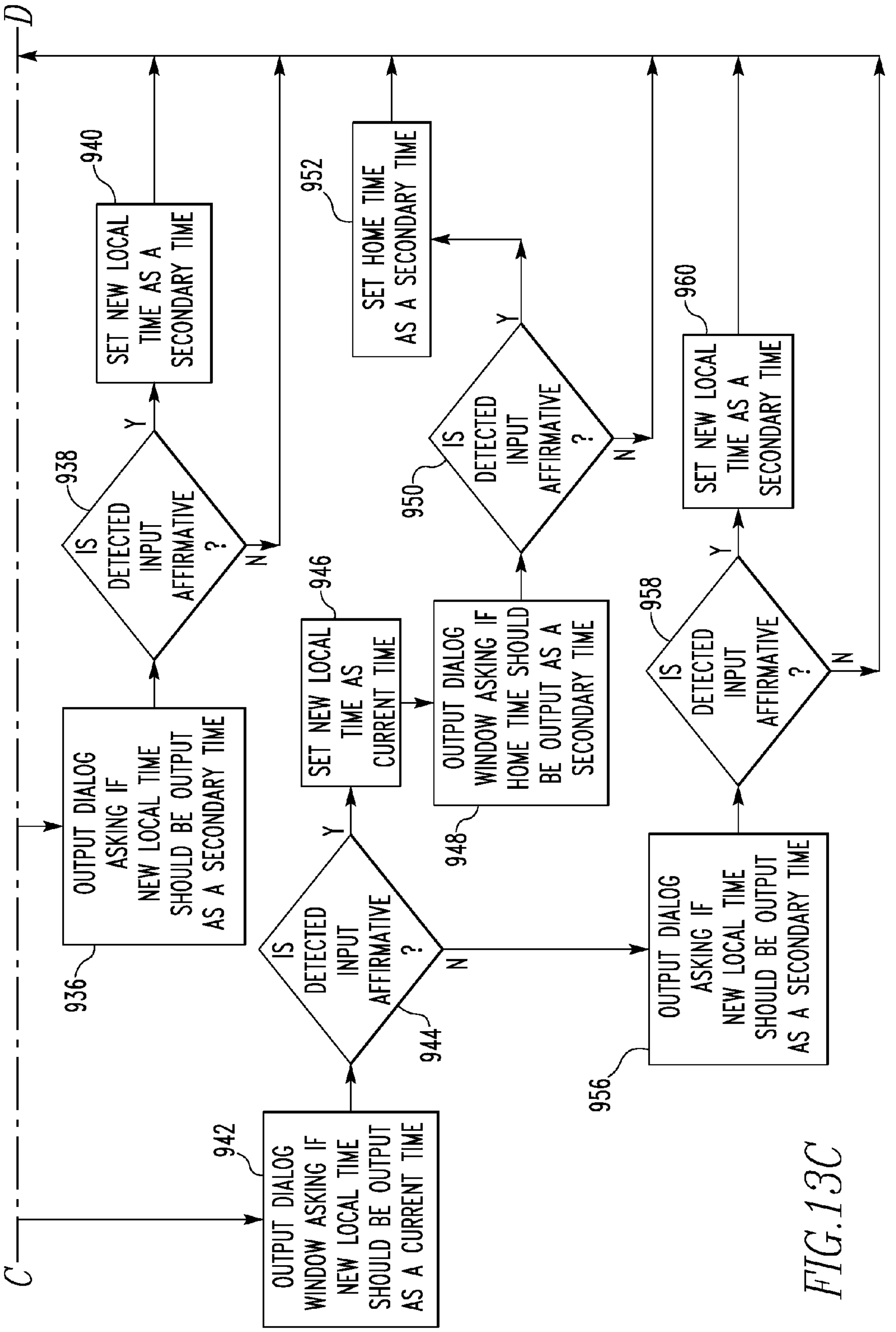

FIG. 13 depicts a flowchart showing certain aspects of the dialog operations that are discussed above in conjunction with FIGS. 5A, 5B, 5C, 6A, and 6B. At 902 the home time is set as being the current time. At 904 the current time and any secondary times are output. If at 906 it is determined that no change in time zone has occurred, processing loops back to 904. However, if at 906 it is determined that a change in time zone has occurred, processing continues, as at 910, where it is determined whether the new local time is already set to be always output as a current time, such as if a selection of the box 78 in FIG. 5A had occurred along with a selection of the YES alternative. In such a situation, the new local time will automatically be set as the current time, as at 912. It will be then be determined, as at 914, whether the home time is already set to be always output as a secondary time, such as if a selection of the box 81 in FIG. 5B had occurred along with a selection of the YES alternative. In such a situation, the home time will automatically be set as a secondary time, as at 916, and processing continues, as at 904, where the reset current time and the reset or newly generated secondary time will be output, along with any original secondary times that were not reset.

In this regard, it is noted that the outputting of the home time as a secondary time may, for example, be in the nature of a resetting of a secondary time that had already been output on the display 18, or it may, for example, be in the nature of an outputting of a new secondary time that had not previously been output on the display 18. Moreover, it is noted that multiple secondary times may be output concurrently on the display 18, and in such a situation the outputting of a home time as a secondary time may result in a preexisting secondary time remaining unchanged.

However, if at 914 it is determined that the home time is not already set to be always output as a secondary time, it will be determined, as at 918, whether the home time is already set to never be output as a secondary time, such as if a selection of the box 81 in FIG. 5B had occurred along with a selection of the NO alternative. In such a situation, processing will continue to 904. On the other hand, if it is determined that at 918 that the home time has not already been set to never be output as a secondary time, processing continues to 920 where the second dialog 80 is output on the display 18, as in FIG. 5B, requesting an input regarding whether the home time should be output as a secondary time. If a detected response is determined at 922 to be an affirmative response, the home time will be set, as at 924, as a secondary time. Processing will thereafter continue, as at 904. However, if at 922 the detected input is not affirmative, processing continues to 904.

If it is determined, as at 910, that the new local time has not already been set to always be output as a current time, processing continues at 926 where it is determined whether the new local time has already been set to never be output as a current time, such as will occur in the event of a selection of the box 78 in FIG. 5A along with a selection of the NO alternative. In such a situation, processing continues, as at 928, where it is determined whether the new local time has already been set to always be output as a secondary time, such as if a selection of the box 85 in FIG. 5C had occurred along with a selection of the YES alternative. In such a situation, processing continues, as at 930, where the new local time is set as a secondary time, after which processing continues to 904.

On the other hand, if it is determined at 928 that the new local time has not already been set to always be output as a secondary time, processing continues, as at 932, where it is determined whether the new local time has already been set to never be output as a secondary time, such as if a selection of the box 85 in FIG. 5C had occurred along with a selection of the NO alternative. In such a situation, processing continues, as at 904, where the original current time and any original secondary times is output. However, if at 932 it is determined that the new local time has not already been set to never be output as a secondary time, processing continues at 936 where the alternate second dialog 84 will be output on the display, as in FIG. 5C. Thereafter, if at 938 the responsive input is detected as being an affirmative input, i.e., a selection of the YES alternative, processing continues, as at 940, where the new local time is set as a secondary time. Processing will thereafter continue at 904. However, if at 938 the detected input is not affirmative, i.e., a detected selection of the NO alternative in FIG. 5C, processing continues at 904 where the original current time and any original secondary times is output.

On the other hand, if it is determined at 926 that the new local time has not already been set to never be output as a current time, processing continues at 942 where the first dialog 76 is output as at FIG. 5A, requesting an input regarding whether the new local time should be output as a current time. If at 944 the detected input is affirmative, such as a selection the "YES" alternative in FIG. 5A, processing continues at 946 where the new local time is set as the current time. Processing thereafter continues at 948 where the second dialog 80 is output, as in FIG. 5B, requesting an input regarding whether the home time should be output as a secondary time. If at 950 it is determined that the input detected from FIG. 5B is affirmative, such as from a selection of the "YES" alternative, processing continues, as at 952, where the home time is set as a secondary time. Thereafter, processing continues, as at 904. However, if at 950 the detected input is negative, such as if in FIG. 5B the detected input was a selection of the "NO" alternative, processing continues to 904 where the reset current time and any original secondary times are output.

On the other hand, if the input detected at 944 is negative, such as if the input in FIG. 5A was a detected selection of the "NO" alternative, processing continues, as at 956, where the alternate second dialog 84 is output on the display 18, as in FIG. 5C, requesting an input regarding whether the new local time should be output as a secondary time. If at 958 the detected input is affirmative, such as if the "YES" alternative had been selected in FIG. 5C, processing continues, as at 960, where the new local time is set as a secondary time. Processing thereafter continues at 904. On the other hand, if the input detected at 958 is negative, such as if at FIG. 5C, the detected input was the "NO" alternative, processing continues at 904 where the original current time and any original secondary times are output.

Figure 14A:
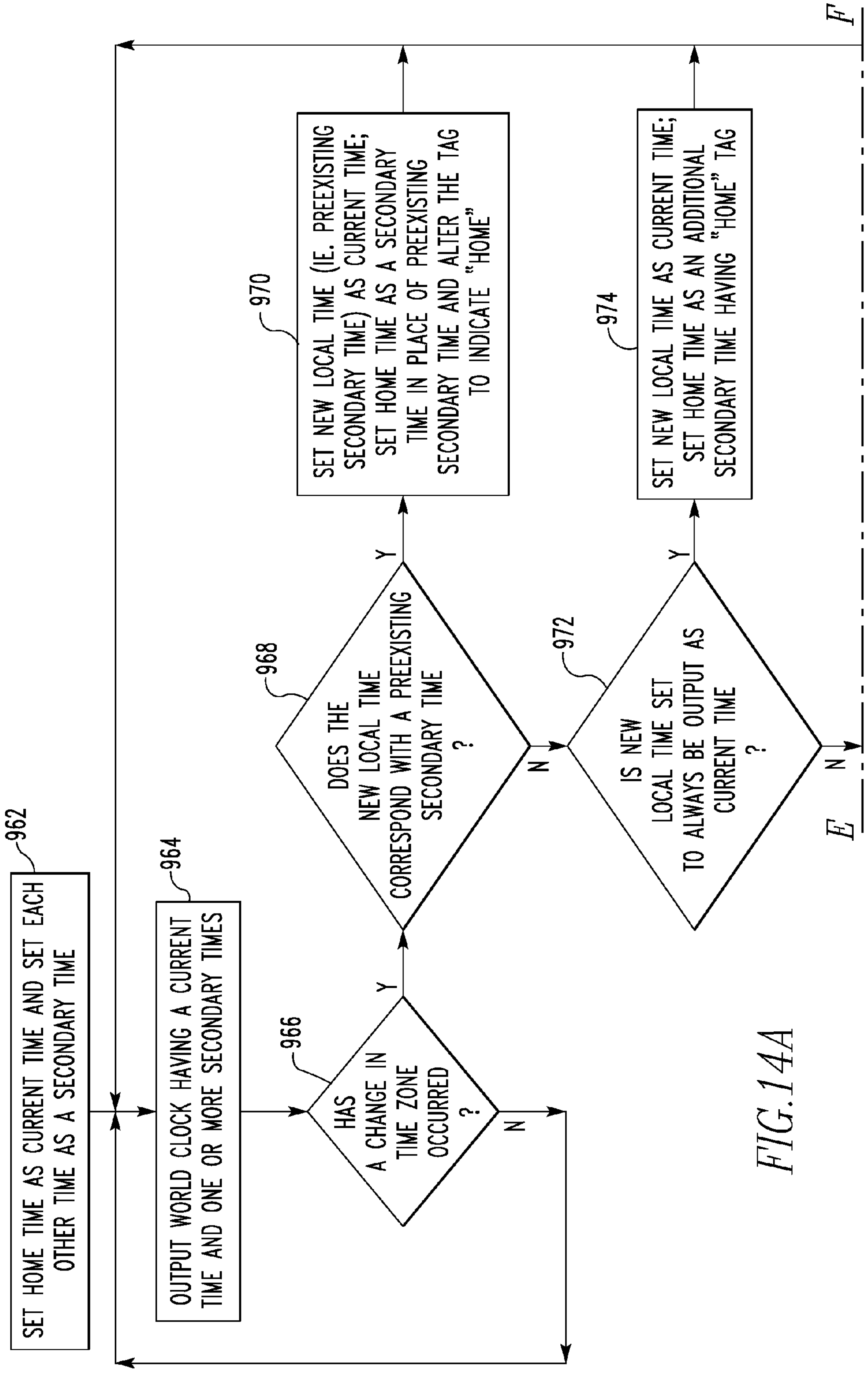
FIG. 14 is another exemplary flowchart of a portion of the improved method, and it extends across two pages indicated as 14A and 14B.
Figure 14B:
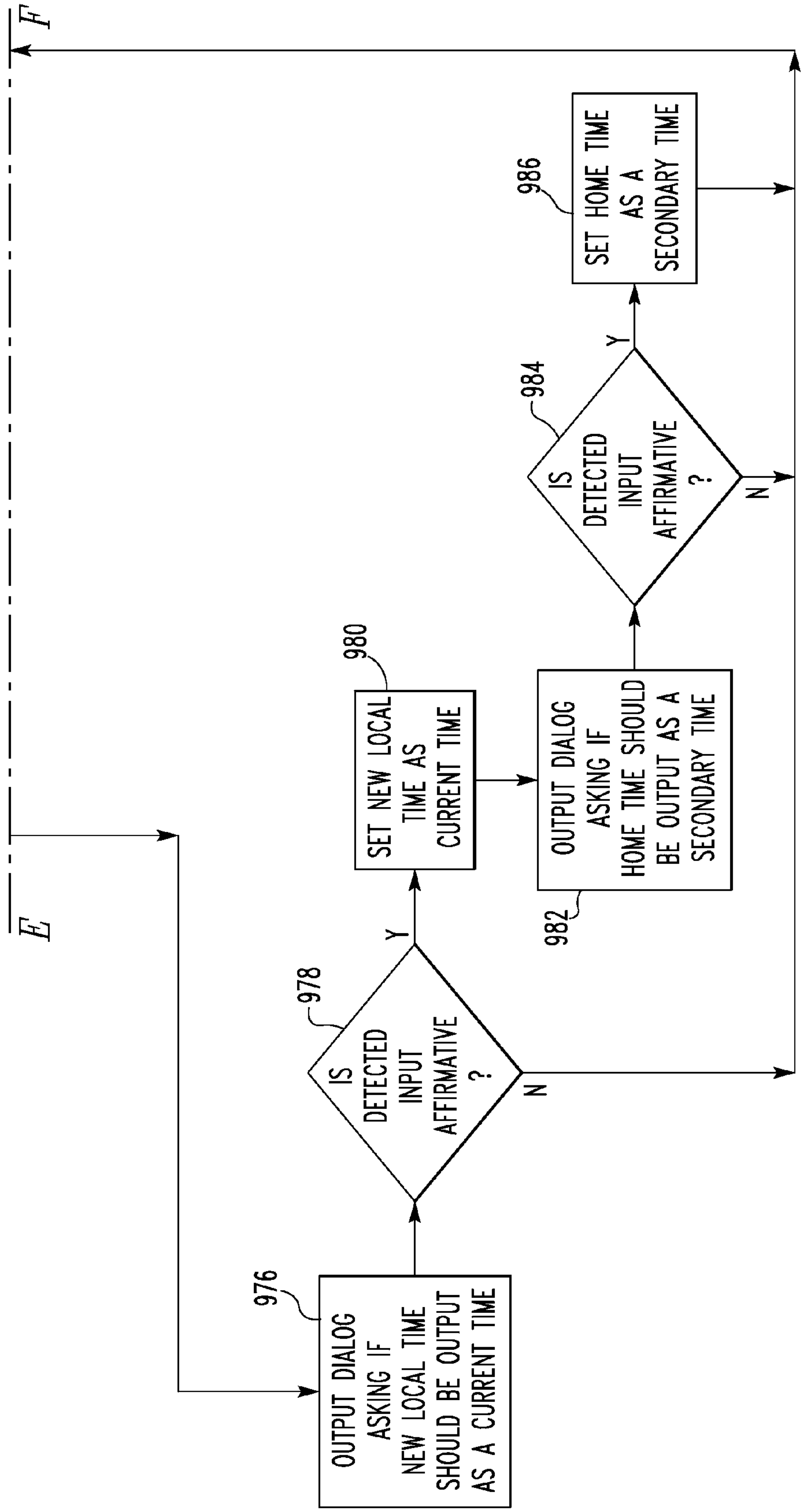

FIG. 14 depicts an exemplary flowchart showing some of the operation of the "world clock" feature described above in connection with FIGS. 6C-6G. Processing begins, as at 962, where the home time is set as a current time and each other time is set as a secondary time. The current and secondary times are then output, as at 964. It is then determined, as at 966, whether a change in time zone has occurred. If not, processing loops back to 964 where the original current and secondary times continue to be output. On the other hand, if at 966 a change in time zone is detected, processing continues at 968 where it is determined whether the new local time corresponds with one of the preexisting secondary times. Such a situation will occur, as in FIGS. 6C and 6E, where the secondary time for "London" and the new local time are determined to be the same. In such a situation, processing continues, as at 970, where the new local time, i.e., the preexisting secondary time, is set as the current time. Additionally, at 970 the home time is set as a secondary time in place of the preexisting secondary time, and the tag of the preexisting secondary time is altered to indicate "HOME", such as the home time. Processing continues at 964 where the updated "world clock" is output on the display 18, as at FIGS. 6D and 6F of the present example.

On the other hand, if the new local time is determined at 968 to not correspond with a preexisting secondary time, processing continues at 972, where it is determined whether the new local time has already been set to always be set as the current time. If so, processing continues at 974, where the new local time is set as the current time, with the home time being set as an additional secondary time having as its tag the word "HOME". Processing continues at 964 where the updated "world clock" is output on the display 18.

Alternatively, if at 972 it is determined that the new local time has not already been set to always be output as the current time, processing continues, as at 976, where a dialog is output asking whether the new local time should be output as a current time. This is may be output with the user of the first dialog 76 of FIG. 5A. If at 978 the detected response is not in the affirmative, i.e., a detected selection of the NO alternative, processing continues, as at 964, where the original current and secondary times are output. However, if at 978 the detected input is affirmative, i.e., a detected selection of the YES alternative, the new local time is set as the current time, as at 980. Also, at 982 a dialog is output asking whether the home time should be output as a secondary time, such as with the second dialog 80 of FIG. 5B. If the detected response is determined at 984 to be in the affirmative, the home time will be set as a secondary time, as at 986. Afterward, processing continues, as at 964, where the reset current and secondary times, as well as any unchanged secondary times, are output. On the other hand, if at 984 the detected input is not affirmative, processing continues at 964 where the reset current time and the original secondary times are output.

Figure 15:
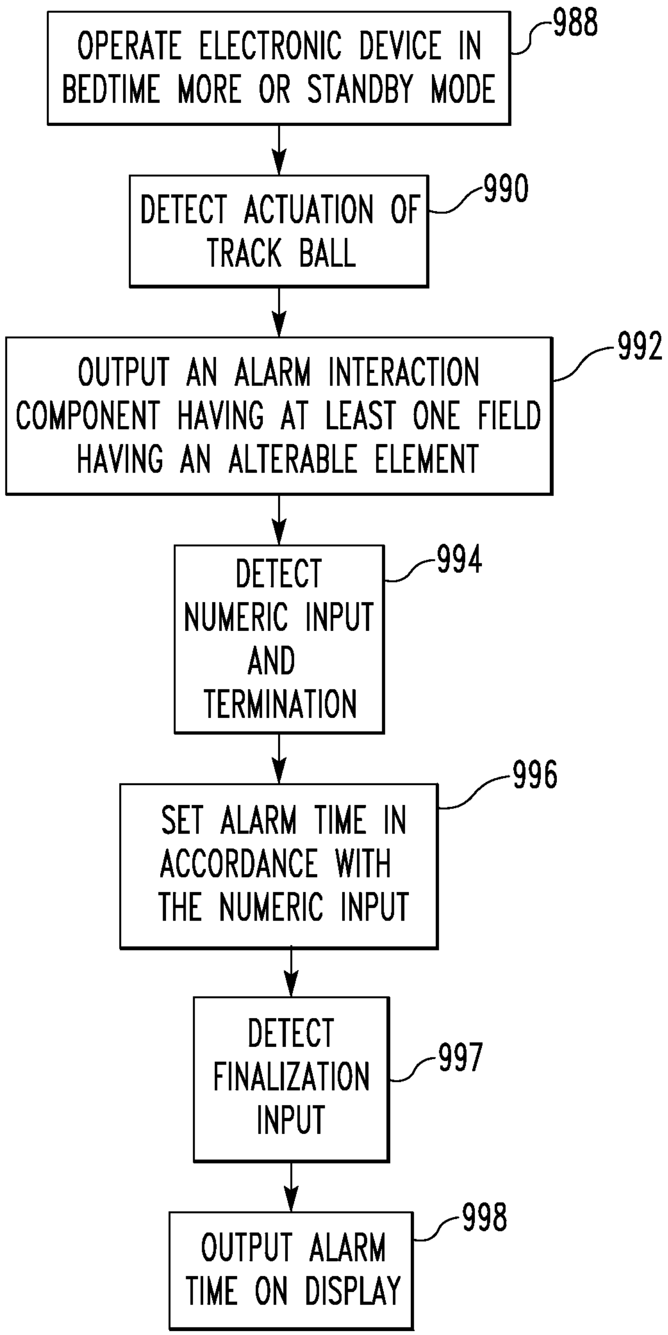
FIG. 15 is another exemplary flowchart of a portion of the improved method.

FIG. 15 depicts in a flowchart aspects of a numeric input for the setting of an alarm, such as was described above in connection with FIGS. 7A-7H. Specifically, processing begins at 988 where the electronic device 4 is operated in BEDTIME mode or STANDBY mode. At 990, a predetermined input, such as a translation of the track ball 32 in direction toward the housing 6, is detected. At 992, the alarm interaction component 873 is output on the display 18. At 994, a numeric input plus a termination, whether express or implied, is detected. At 996, the alarm time is set in accordance with at least the numeric input, i.e., the numeric input may optionally be followed by an express termination such as "a" or "p" or a selection input from the track ball 32. Similarly, the detected numeric input may fully establish the alarm time, such as by the detection of an input such as "0645" or "1845", by way of example. A detection at 997 of another predetermined input, such as a translation of the track ball 32 in direction toward the housing 6, finalizes the alarm time. The alarm time is then output on the display, as at 988.

It is noted that additional benefits are provided by the multiple-axis input device mentioned above. For instance, a portion of the home screen depicted in FIG. 1 is depicted at the numeral 1060 in FIG. 16. The home screen portion 1060 can be visually output on the display 18 and can be said to include a plurality of icons 1062 that are selectable via a user input means for the purpose of, for example, initiating the execution on the processor apparatus 16 of a routine that is represented by an icon 1062. The track ball 32 is rotatable to provide, for example, navigational inputs among the icons 1062. In addition, a touch screen device may provide a suitable user interface for enabling execution of a routine.

Figure 16:
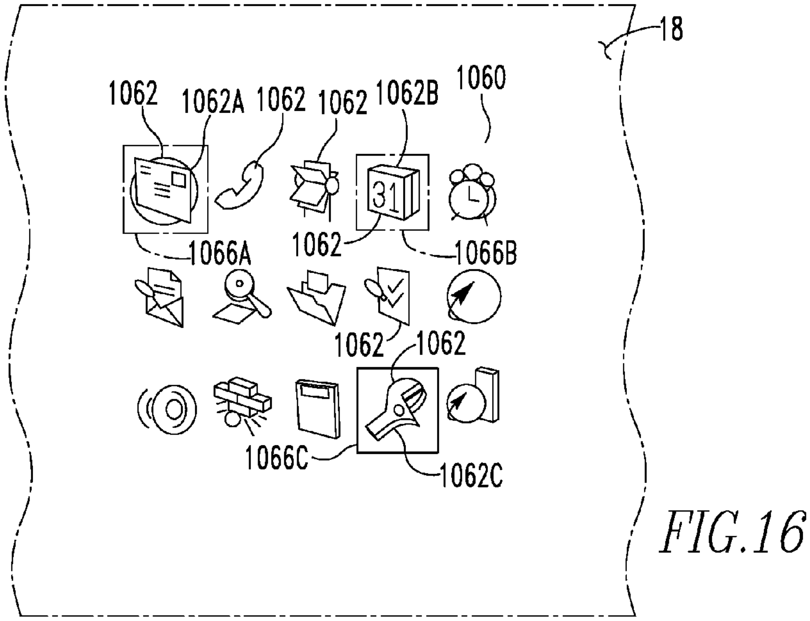
FIG. 16 depicts a portion of an exemplary home screen that can be output on the display.

For example, FIG. 16 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be concurrently depicted on the display 18, but rather are intended to together depict a series of situations and to indicate movement of the indicator 1066 among the icons 1062. The particular location of the indicator 1066 at any given time indicates the particular icon 1062, for example, that is the subject of a selection focus of the electronic device 4. Whenever an icon 1062 or other selectable object is the subject of the selection focus, a selection input to the processor apparatus 16 will result in execution or initiation of the routine or other function that is represented by the icon 1062 or other selectable object.

The movement of the indicator 1066 from the icon 1062A, as indicated with the indicator 1066A, to the icon 1062B, as is indicated by the indicator 1066B, can result, for example, from a detected rotation of the track ball 32 about the vertical axis 34B to provide a horizontal navigational input. As mentioned above, a rotation of the track ball 32 a predetermined rotational distance, i.e., a rotation through a predetermined angle, results in an input to the processor apparatus 16. In the present example, the track ball 32 will have been detected as having been rotated about the vertical axis 34B a rotational distance equal to three times the predetermined rotational distance since the icon 62B is disposed three icons 1062 to the right the icon 1062A. Such rotation of the track ball 32 likely will have been made in a single motion by the user, but this need not necessarily be the case.

Similarly, the movement of the indicator 1066 from the icon 1062B, as indicated by the indicator 1066B, to the icon 1062C, as is indicated by the indicator 1066C, may result from a detected rotation of the track ball 32 about the horizontal axis 34A to provide a vertical navigational input. In so doing, the track ball 32 will have been detected as having been rotated a rotational distance equal to two times the predetermined rotational distance since the icon 1062C is disposed two icons 1062 below the icon 1062B. Such rotation of the track ball 32 likely will have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine is active on the electronic device 4 as inputs that can be employed by such routine. For example, the GUI 46 that is active on the electronic device 4 in FIG. 16 may require vertical and horizontal navigational inputs to move the indicator 1066, and thus the selection focus, among the icons 1062. If rotation of the track ball 32 about an axis oblique to the horizontal axis 34A and the vertical axis 34B is detected, the GUI 46 may resolve such an oblique rotation of the track ball 32 into vertical and horizontal components which can then be interpreted by the GUI 46 as vertical and horizontal navigational movements, respectively. In such a situation, if one of the resolved vertical and horizontal navigational movements is of a greater magnitude than the other, the resolved navigational movement having the greater magnitude may be employed by the GUI 46 as a navigational input in that direction to move the indicator 1066 and the selection focus, and the other resolved navigational movement may be ignored by the GUI 46, for example. In other embodiments, such a rotation of the track ball 32 about an axis oblique to the horizontal axis 34A and the vertical axis 34B may be interpreted as a navigational input in an oblique direction without resolution of the input into vertical and horizontal components or other components.

When the indicator 1066 is disposed on the icon 1062C, as is indicated by the indicator 1066C, the selection focus of the electronic device 4 is on the icon 1062C. As such, a detected translation of the track ball 32 toward the housing 6 as described above will provide an input to the processor apparatus 16 that will be interpreted by the GUI 46 as a selection input with respect to the icon 1062C. In response to such a selection input, the processor apparatus 16 will, for example, begin to execute a routine that is represented by the icon 1062C. It thus can be understood that the track ball 32 is rotatable to provide navigational and other inputs in multiple directions, and can also be translated to provide a selection input or other input.

Figure 18:
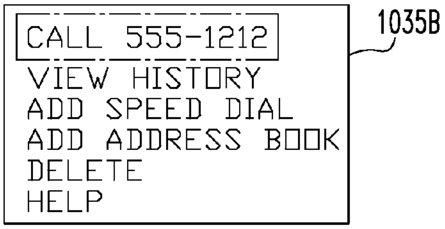
FIG. 18 depicts another exemplary menu.

As mentioned above, FIG. 17 depicts an exemplary menu 1035A that will be appropriate if the current logical location within the logical menu tree is that of displaying an email within an email routine. That is, the menu 1035A provides selectable options that will be appropriate given that the current logical location within the logical menu tree is the displaying of an email within an email routine. In a similar fashion, FIG. 18 depicts another exemplary menu 1035B that will be depicted if the current logical location within the logical menu tree is within a telephone routine.

Detected rotational movement inputs from the track ball 32 can be employed to navigate among, for example, the menus 1035A and 1035B. For instance, after a detected actuation of the <MENU> key 33 and an outputting by the GUI 46 of a resultant menu, the track ball 32 can be rotated to provide scrolling inputs to successively highlight the various selectable options within the menu. Once the desired selectable option is highlighted, i.e., is the subject of the selection focus, the track ball 32 can be translated toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 46 to output a reduced menu. For instance, a detected translation of the track ball 32 toward the housing 6 can result in the generation and output of a more limited version of a menu than will have been generated if the <MENU> key 33 had instead been actuated. Such a reduced menu will therefore be appropriate to the current logical location within the logical menu tree and will provide those selectable options which have a high likelihood of being selected. Detected rotational movements of the track ball 32 can provide scrolling inputs to scroll among the selectable options within the reduced menu 1035C, and detected translation movements of the track ball 32 can provide selection inputs to initiate whatever function is represented by the selectable option within the reduce menu 1035C that is currently highlighted.

Figure 19:
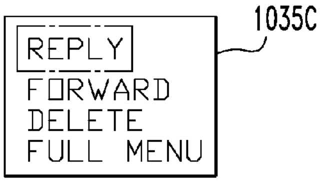
FIG. 19 depicts an exemplary reduced menu.

By way of example, if the track ball 32 is translated instead of the <MENU> key 33 being actuated to generate the menu 1035A, the GUI 46 will generate and output on the display the reduced menu 1035C that is depicted generally in FIG. 19. The exemplary reduced menu 1035C provides as selectable options a number of the selectable options from the menu 1035A that are most likely to be selected. As such, a relatively routine function can be initiated in conjunction with a translation of the track ball 32 to generate and output the reduced menu 1035C, instead of in conjunction with an actuation of the <MENU> key 33 to display the full menu 1035A. The track ball 32 can then be conveniently rotated to provide scrolling inputs to highlight a desired selectable option, and the track ball 32 can then be translated to provide a selection input which will initiate the function represented by the selectable option in the reduced menu 1035C that is currently highlighted.

In the present exemplary embodiment, many of the menus that can be generated as a result of an actuation of the <MENU> key 33 can instead be generated and output in reduced form as a reduced menu in response to a translation of the track ball 32 toward the housing 6. It is noted, however, that a reduced menu may not be available for each full menu that can be generated from an actuation of the <MENU> key 33. Depending upon the specific logical location within the logical menu tree, a translation of the track ball 32 may be interpreted as a selection input rather than an input seeking a reduced menu. For instance, a translation of the track ball 32 on the home screen portion 1060 depicted in FIG. 16 will result in a selection input as to whichever of the icons 1062 is the subject of the input focus. If the <MENU> key 33 is actuated on the home screen portion 1060, the GUI 46 will output a menu appropriate to the home screen portion 1060, such as a full menu of all of the functions that are available on the electronic device 4, including those that may not be represented by icons 1062 on the home screen portion 1060.

Figure 20:
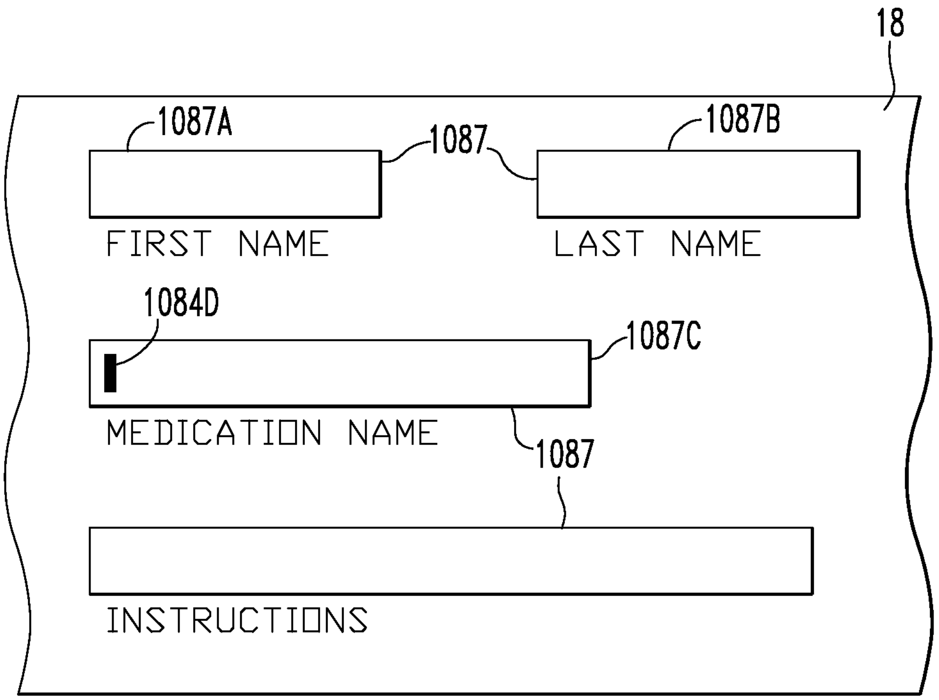
FIG. 20 is an exemplary output during a data entry operation.

FIG. 20 depicts another exemplary output on the display 18 such as may be employed by a data entry routine. The exemplary output of FIG. 20 comprises a plurality of input fields 1087 with corresponding descriptions. A cursor 1084D, when disposed within one of the input fields 1087, indicates that an input focus of the electronic device 4 is on that input field 1087. That is, detected inputs such as text, numbers, symbols, and the like, will be entered into whichever input field 1087 is active, i.e., is the subject of the input focus. It is understood that the electronic device 4 may perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 can include the input fields 1087A, 1087B, and 1087C. FIG. 20 depicts the cursor 1084D as being disposed in the input field 1087C, indicating that the input field 1087C is the subject of the input focus of the electronic device 4. It is understood that the cursor 1084D, and thus the input focus, can be shifted from the input field 1087C to the input field 1087A, which is disposed adjacent and vertically above the input field 1087C, upon detecting a vertical scrolling input in the upward direction with the track ball 32. That is, the track ball 32 will be detected as having been rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, upon a detection of a horizontal scrolling input to the right with the track ball 32. That is, such a horizontal scrolling input can be detected from a rotation of the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs in other applications will be apparent.

Figure 21:
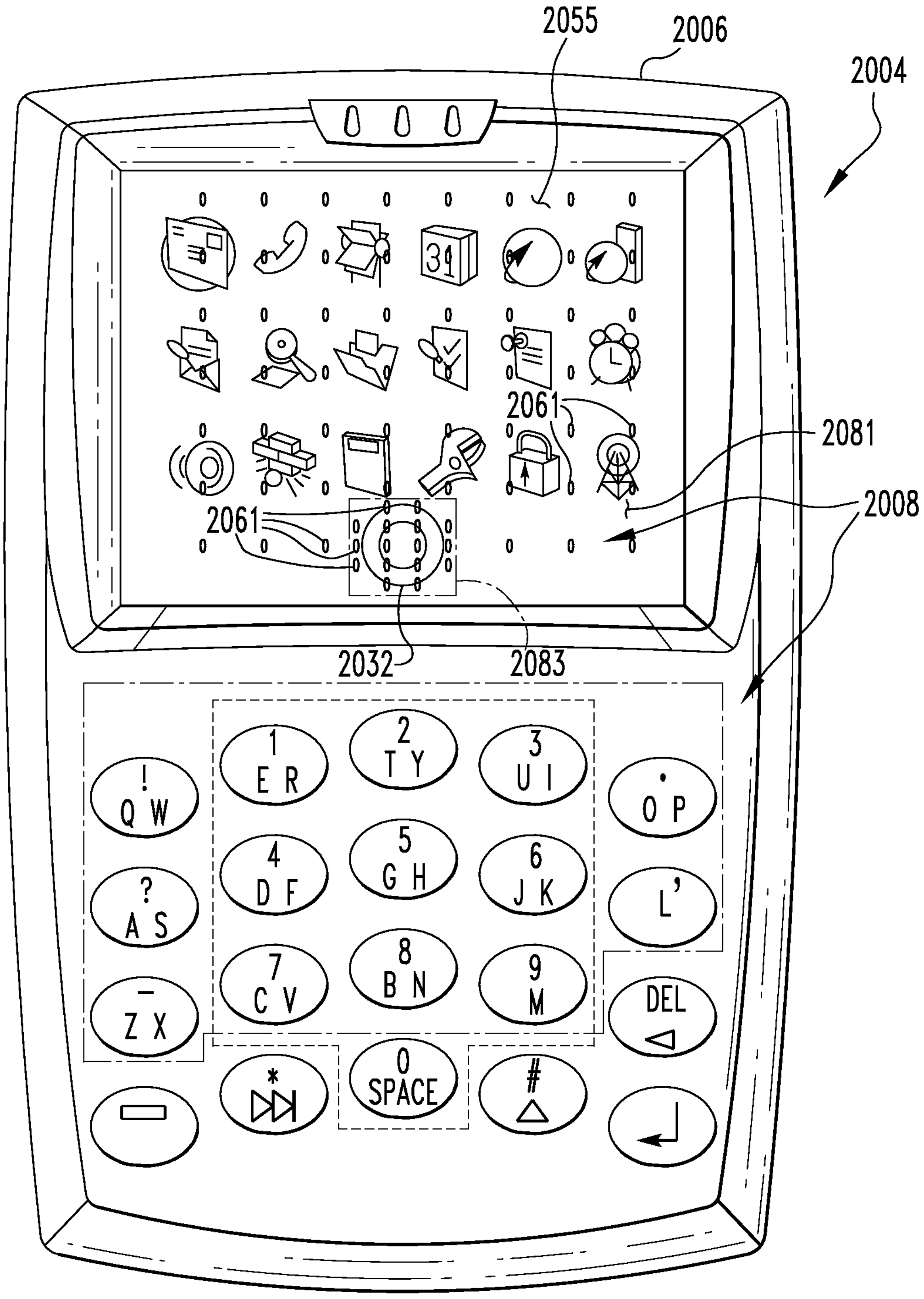
FIG. 21 is a top plan view of an improved electronic device in accordance with another embodiment of the present disclosure.
Figure 22:
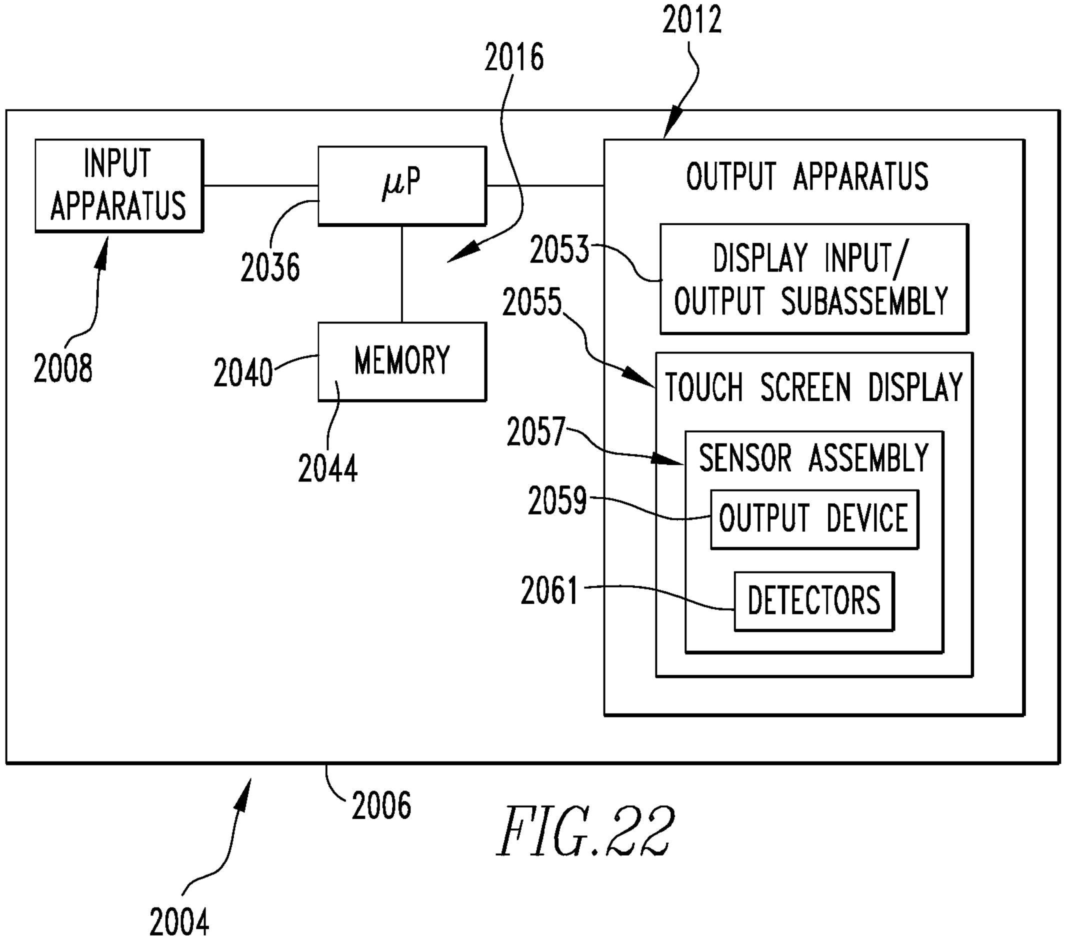
FIG. 22 is a schematic depiction of the electronic device of FIG. 21.

An improved electronic device 2004 in accordance with another embodiment of the disclosed concept is depicted generally in FIG. 21 and FIG. 22. The electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the electronic device 4 can be performed on or with the electronic device 2004. As such, the features of the electronic device 2004 that are common with the electronic device 4, and this will comprise essentially all of the features of the electronic device 4, will generally not be repeated.

As a general matter, the electronic device 2004 is substantially similar in configuration and function to the electronic device 4, except that the electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals into data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that will be disposed on one side of the touch screen display 2055 and a corresponding grid without columns will be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, any pixel that is disposed adjacent a detector 2061 will have a reduced size, or aperture, to accommodate the adjacent detector 2061.

The detectors 2061 are disposed in a pattern, and at least some of the detectors 2061 may be arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 21, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. The spacing of the detectors 2061 on the first area 2081 may be, for example, between about 1.0 mm and 10.0 mm between the detectors 2061, or one exemplary embodiment, about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. The density of the detectors 2061 in the second area 2083 may be, for exaample, between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size will be very large, the aspect ratio will be significantly higher than that of pixels that are not disposed adjacent a detector 2061. The pixels in the second area 2083 likely will be special function pixels, such as pixels that will both depict the virtual track ball 2032 and that will light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 may be interpreted by the processor apparatus as being inputs from the virtual track ball 2032. For instance, an actuation of a sequential plurality of detectors 2061 extending along a particular direction on the touch screen display 2055 in the second area 2083 may be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 can be interpreted by the processor apparatus as actuation inputs of the virtual track ball 2032, such as will be generated by an actuation of the track ball 32 of the electronic device 1004 in a direction toward the housing 1006 thereof. It can be understood that other types of actuations of the detectors 2061 in the second area 2083 can be interpreted as various other inputs without departing from the disclosed concept.

The electronic device 2004 thus comprises a multiple-axis input device 2032 that is non-mechanical but that can provide analogous functional features and advantages as, say, the track ball 32 of the electronic device 4. It is understood that the virtual track ball 2032 is but one example of the many types of multiple-axis input devices that can be employed on the electronic device 2004.

Figure 23:
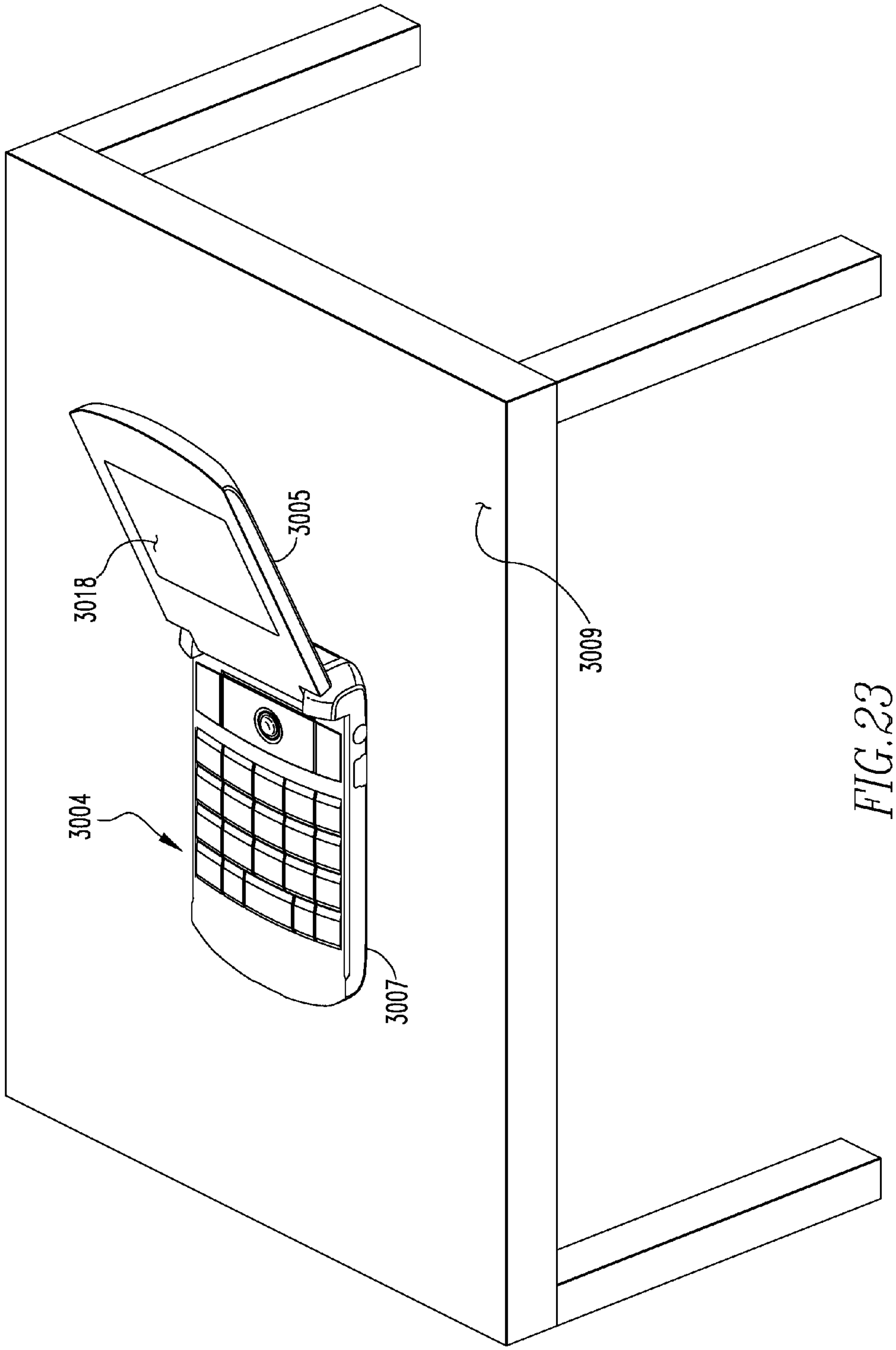
FIG. 23 is a perspective view of an improved electronic device in accordance with another embodiment of the present disclosure.

Another embodiment of an electronic device 3004 in accordance with the disclosed concept is depicted generally in FIG. 23. The electronic device 3004 is in the exemplary form of a "flip-phone" having a housing that comprises a display portion 3005 and a keyboard portion 3007 that are pivotable with respect to one another. The electronic device 3004 can be disposed on a surface such as a table top 3009 in a configuration wherein the keyboard portion 3007 is disposed on the tabletop and the display portion 3005 extends upwardly from the keyboard portion (i.e., an open position). In such a configuration, a display 3018 of the display portion 3005 is readily visible, as will be any clock times and any other visual objects that are output thereon. The electronic device 3004 may be configured to enable the display portion 3005 to be oriented at any of a variety of positions with respect to the keyboard portion 3007, thus facilitating viewing of the display 3018. The connection of the electronic device 3004 with, for instance, a docking station 69 such as is depicted in a schematic fashion in FIG. 2 or a predetermined charging device, may automatically place the electronic device 3004 in the BEDTIME mode as mentioned above. In another embodiment, detection that the electronic device 3004 is in an open position and is coupled to a power source may automatically place the electronic device 3004 in the BEDTIME mode. In another embodiment, detection that the electronic device 3004 is in an open position and lack of detection of user input for a predetermined time may automatically place the electronic device 3004 in the BEDTIME mode. In another embodiment, detection that the electronic device 3004 is not in motion for a predetermined time may automatically place the electronic device 3004 in the BEDTIME mode. Other variations will be apparent.

While specific embodiments of the disclosed concept have been described in detail, it will be appreciated by those skilled in the art that various modifications and alternatives to those details can be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method on an electronic device that comprises a display, the method comprising:

displaying an alarm time, and a current time with use of a visual object having a size in one dimension that is at least about one-half as long as a physical length of the display in the one dimension;

responsive to an actuation of a first input, displaying in place of the alarm time, an interaction component having a plurality of fields comprising alterable elements of an alarm, the interaction component and the current time being visible at the same time;

altering at least one of the plurality of alterable elements highlighted on the display in response to receipt of at least one second input to the interaction component;

moving a focus on the display to highlight at least one other of the plurality of alterable elements on the display after altering a previous one of the plurality of alterable inputs, the altering and moving comprising modifying the interaction component on the display while continuing to display the current time; and updating the alarm time and replacing the interaction component with an updated alarm time after detecting a termination input.

2. The method of claim 1, wherein the termination input is an explicit termination input.

3. The method of claim 1, wherein altering comprises outputting in the at least one field an altered version of the alterable element.

4. The method of claim 1, wherein actuation of the first input comprises actuation of a multiple-axis input device; and wherein the method further comprises:

detecting receipt of a navigational input of the multiple-axis input device as a second input: and responsive thereto, altering a respective alterable element.

5. The method of claim 4 wherein the electronic device further comprises a processor, and wherein the method further comprises:

responsive to the actuation of the first input, directing the focus onto the at least one field; and detecting as the navigational input a navigational input within the at least one field among a number of selectable choices comprising one or more of:

an "ON" selectable choice, or an "OFF" selectable choice.

6. The method of claim 4, further comprising detecting as the navigational input a navigational input within the at least one field among a number of selectable choices comprising:

an "ON" selectable choice, an "OFF" selectable choice, or an "ON" selectable choice as to all weekdays.

7. The method of claim 4 wherein the electronic device further comprises a processor, and wherein the method further comprises:

directing the focus onto the at least one field;

detecting as the navigational input a navigational input in a first direction;

detecting another navigational input of the multiple-axis input device in a second direction different from first direction; and responsive to the detecting of the another navigational input, shifting the focus from the at least one field onto another field of the interaction component.

8. The method of claim 7, further comprising outputting the another field at a location disposed in the second direction from the at least one field.

9. The method of claim 1 wherein the method further comprises outputting as the interaction component an enlarged version of the alarm time in place of the alarm time.

10. The method of claim 1 wherein the method further comprises:

detecting as an input an alteration of the alarm time to a different alarm time; and outputting in place of the alarm time the different alarm time.

11. An electronic device comprising:

a processor;

a display; and a memory, the memory having stored therein a number of instructions which, when executed on the processor, causes the electronic device to perform operations comprising:

displaying an alarm time, and a current time with use of a visual object having a size in one dimension that is at least about one-half as long as a physical length of the display in the one dimension;

responsive to an actuation of a first input, displaying in place of the alarm time, an interaction component having a plurality of fields comprising alterable elements of an alarm, the interaction component and the current time being visible at the same time;

altering at least one of the plurality of alterable elements highlighted on the display in response to receipt of at least one second input to the interaction component;

moving a focus on the display to highlight at least one other of the plurality of alterable elements on the display after altering a previous one of the plurality of alterable inputs, the altering and moving comprising modifying the interaction component on the display while continuing to display the current time; and updating the alarm time and replacing the interaction component with an updated alarm time after detecting a termination input.

12. The electronic device of claim 11, wherein the termination input is an explicit termination input.

13. The electronic device of claim 11, wherein altering comprises outputting in the at least one field an altered version of the alterable element.

14. The electronic device of claim 11, wherein actuation of the first input comprises actuation of a multiple-axis input device; and wherein the operations further comprise:

detecting receipt of a navigational input of the multiple-axis input device as the second input: and responsive thereto, altering a respective alterable element.

15. The electronic device of claim 14 wherein the operations further comprise:

responsive to the actuation of the first input, directing the focus onto the at least one field; and detecting as the navigational input a navigational input within the at least one field among a number of selectable choices comprising one or more of:

an "ON" selectable choice, or an "OFF" selectable choice.

16. The electronic device of claim 14, wherein the operations further comprise detecting as the navigational input a navigational input within the at least one field among a number of selectable choices comprising:

an "ON" selectable choice, an "OFF" selectable choice, or an "ON" selectable choice as to all weekdays.

17. The electronic device of claim 14 wherein the operations further comprise:

directing the focus onto the at least one field;

detecting as the navigational input a navigational input in a first direction;

detecting another navigational input of the multiple-axis input device in a second direction different from first direction; and responsive to the detecting of the another navigational input, shifting the focus from the at least one field onto another field of the interaction component.

18. The electronic device of claim 17, wherein the operations further comprise outputting the another field at a location disposed in the second direction from the at least one field.

19. The electronic device of claim 11 wherein executing the electronic device comprises outputting as the interaction component an enlarged version of the alarm time in place of the alarm time.

20. The electronic device of claim 11 wherein the operations further comprise:

detecting as an input an alteration of the alarm time to a different alarm time; and outputting in place of the alarm time the different alarm time.

* * * * *